United States Patent
Lee et al.

(10) Patent No.: US 9,037,524 B2
(45) Date of Patent: May 19, 2015

(54) NEURAL WORKING MEMORY DEVICE

(75) Inventors: Jun Haeng Lee, Hwaseong-si (KR);
Chang-Woo Shin, Hwaseong-si (KR);
Hyun Surk Ryu, Hwaseong-si (KR);
Keun Joo Park, Seoul (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 311 days.

(21) Appl. No.: 13/555,382

(22) Filed: Jul. 23, 2012

(65) Prior Publication Data
US 2013/0151451 A1 Jun. 13, 2013

(30) Foreign Application Priority Data

Dec. 9, 2011 (KR) .................. 10-2011-0131604

(51) Int. Cl.
*G06E 1/00* (2006.01)
*G06N 3/06* (2006.01)

(52) U.S. Cl.
CPC ....................... *G06N 3/06* (2013.01)

(58) Field of Classification Search
CPC ....................................... G06N 3/06
See application file for complete search history.

(56) References Cited

U.S. PATENT DOCUMENTS

| 6,205,081 B1 | 3/2001 | Lee |
| 6,581,046 B1 | 6/2003 | Ahissar |
| 2009/0287624 A1* | 11/2009 | Rouat et al. ............. 706/20 |
| 2010/0179935 A1 | 7/2010 | Srinivasa et al. |
| 2011/0153533 A1 | 6/2011 | Jackson et al. |
| 2013/0117212 A1* | 5/2013 | Hunzinger et al. .......... 706/25 |

FOREIGN PATENT DOCUMENTS

| JP | 09-024031 | 1/1997 |
| JP | 2005-032216 | 2/2005 |
| JP | 2006-171714 | 6/2006 |
| JP | 2009-032259 | 2/2009 |
| JP | 2010-146514 | 7/2010 |
| JP | 2010-287062 | 12/2010 |
| KR | 10-0567465 | 4/2006 |
| KR | 10-2010-0129741 | 12/2010 |

OTHER PUBLICATIONS

European Search Report issued April 16, 2013 in counterpart European Application No. 12196277.3-1951.
Juan Carlos Herrero. "CDMA & TDMA Based Neural Nets." International journal of neural systems, 11 No. 03 (Jun. 2001): pp. 237-246.

(Continued)

*Primary Examiner* — Alan Chen
(74) *Attorney, Agent, or Firm* — NSIP Law

(57) ABSTRACT

A spiking neuron-based working memory device is provided. The spiking neuron-based working memory device includes an input interface configured to convert input spike signals into respective burst signals having predetermined forms, and output a sequence of the burst signals, the burst signals corresponding to the input spike signals in a burst structure, and two or more memory elements (MEs) configured to sequentially store features respectively corresponding to the outputted sequence of the burst signals, each of the MEs continuously outputting spike signals respectively corresponding to the stored features.

24 Claims, 28 Drawing Sheets

(56) References Cited

OTHER PUBLICATIONS

Zamarreno-Ramos, Carlos et al. "LVDS interface for AER links with burst mode operation capability." Circuits and Systems, IEEE International Symposium on, (May 2008) pp. 644-647.

Savino, Guillermo V., and Carlos M. Formigli. "Nonlinear electronic circuit with neuron like bursting and spiking dynamics." BioSystems 97.1 (Jul. 2009) pp. 9-14.

* cited by examiner

FIG. 24

NEURAL WORKING MEMORY DEVICE

CROSS-REFERENCE TO RELATED APPLICATIONS

This application claims the benefit under 35 U.S.C. §119 (a) of Korean Patent Application No. 10-2011-0131604, filed on Dec. 9, 2011, in the Korean Intellectual Property Office, the entire disclosure of which is incorporated herein by reference for all purposes.

BACKGROUND

1. Field

The following description relates to a working memory device including spiking neurons.

2. Description of Related Art

A spiking neural network (SNN) mimics nerve cells in a brain to embody a neural circuit having an intelligence that supports cognition and inference. Technologies in this field include the appropriate mimicking of a main operation of a neural cell, hereinafter referred to as a neuron, and the connection of neurons to embody a circuit to perform a predetermined function. Related neuron circuit technologies include models that hierarchically connect neurons to classify patterns. With respect to a spatio-temporal pattern, of which an input pattern varies over time, it is difficult to perform the cognition and inference through the neuron circuit of the related model. Accordingly, a neuron circuit that temporarily stores, during a predetermined time, a pattern that varies over time is desired.

SUMMARY

In one general aspect, there is provided a spiking neuron-based working memory device, including an input interface configured to convert input spike signals into respective burst signals having predetermined forms, and output a sequence of the burst signals, the burst signals corresponding to the input spike signals in a burst structure, and two or more memory elements (MEs) configured to sequentially store features respectively corresponding to the outputted sequence of the burst signals, each of the MEs continuously outputting spike signals respectively corresponding to the stored features.

The general aspect of the device may further provide that, when one of the features respectively corresponding to one of the burst signals is stored in one of the MEs, the one of the MEs is deactivated and activates a subsequent one of the MEs.

The general aspect of the device may further provide that, when one of the features respectively corresponding to one of the burst signals is stored in one of the MEs, the one of the MEs continuously outputs one of the spike signals respectively corresponding to the stored one of the features until the one of the MEs is initialized by a reset signal.

The general aspect of the device may further provide that, for each of the features that respectively corresponds to the burst signals, the input interface includes an excitatory neuron and an inhibitory neuron, the excitatory neuron being configured to convert one of the input spike signals to be included in the burst structure, the burst structure having a predetermined time slot, the inhibitory neuron being configured to suppress the excitatory neuron to enable the burst-structured one of the input spike signals to have a predetermined size to generate a corresponding one of the burst signals.

The general aspect of the device may further provide that, for each of the features that respectively corresponds to the burst signals, the input interface further includes a synapse and a noise removal neuron, the synapse having a short-term facilitation characteristic, the synapse being configured to transfer the one of the input spike signals to the noise removal neuron, the noise removal neuron being configured to remove noise from the transferred one of the input spike signals, the noise removal neuron being further configured to transfer the transferred one of the input spike signals from which noise is removed to the excitatory neuron.

The general aspect of the device may further provide that each of the MEs includes gate neurons, a continuity unit, and a control neuron, the gate neurons being configured, when activated, to transfer the burst signals received from the input interface to the continuity unit, the continuity unit being configured, when the transferred burst signals are input, to activate one or more neurons corresponding to the features respectively corresponding to the transferred burst signals, the continuity unit being further configured to continuously output the spike signals respectively corresponding to the features until a reset signal is input, the control neuron being configured to activate or suppress the gate neurons.

The general aspect of the device may further provide that the control neuron is further configured to suppress the gate neurons when the control neuron receives an idle signal from a previous ME or the continuously outputted spike signals, and the control neuron is further configured to activate the gate neurons when an input signal is absent.

The general aspect of the device may further provide that the control neuron is further configured to interrupt a suppression of the gate neurons when one of the burst signals is stored in the previous ME and an outputting of the idle signal from the previous ME is interrupted.

The general aspect of the device may further provide that an amount of the gate neurons is equal to an amount of features corresponding to input spike signals received by the input interface.

The general aspect of the device may further provide that the continuity unit includes continuity neurons for each of the features, one or more idle neurons, and one or more inhibitory neurons, the continuity neurons being configured to continuously output the spike signals respectively corresponding to the features when the transferred burst signals are received, the idle neurons being configured to output an idle signal indicating an idle state in response to the reset signal, the inhibitory neurons being configured to suppress the continuity neurons and the idle neuron so that only one type of the spike signals is output per output.

The general aspect of the device may further provide that the control neuron is further configured to suppress the gate neurons in order to deactivate the gate neurons when one of the a spike signals is received from one of the continuity neurons.

In another aspect, there is provided a spiking neuron-based working memory device, including an input interface configured to convert an input spike signals into respective burst signals having predetermined forms, the burst signals corresponding to the input spike signals in a burst structure, a multiplexer configured to convert the burst signals to multiplexed burst signals having predetermined values, and a shift selector configured to output an activation signal to select one of two or more memory elements (MEs) of the spiking neuron-based working memory device when the multiplexed burst signals output from the multiplexer are input, the MEs being configured to sequentially store features respectively corresponding to the burst signals of the input interface when the activation signal output from the shift selector is received, each of the MEs continuously outputting spike signals respectively corresponding to the stored features.

The other aspect of the device may further provide that, when an external selection signal for selecting one of the MEs is received from an external side of the shift selector, the shift selector outputs the activation signal to the selected one of the MEs.

The other aspect of the device may further provide that the external selection signal is one of a plurality of external selection signals, and an amount of the external selection signals is equal to an amount of the MEs.

The other aspect of the device may further provide that, when one of the features respectively corresponding to one of the burst signals is stored in one of the MEs, the one of the MEs continuously outputs one of the spike signals respectively corresponding to the one of the features until the one of the MEs is initialized by a reset signal.

The other aspect of the device may further provide that, for each of the features that respectively corresponds to the burst signals, the input interface includes an excitatory neuron and an inhibitory neuron, the excitatory neuron being configured to convert one of the input spike signals to be included in the burst structure, the burst structure having a predetermined time slot, the inhibitory neuron being configured to suppress the excitatory neuron to enable the burst-structured one of the input spike signals to have a predetermined size to generate a corresponding one of the burst signals.

The other aspect of the device may further provide that, for each of the features that respectively corresponds to the burst signals, the input interface further includes a synapse and a noise removal neuron, the synapse having a short-term facilitation characteristic, the synapse being configured to transfer the one of the input spike signals to the noise removal neuron, the noise removal neuron being configured to remove noise from the transferred one of the input spike signals, the noise removal neuron being further configured to input by the synapse and to transfer the transferred one of the input spike signals from which noise is removed to the excitatory neuron.

The other aspect of the device may further provide that each of the MEs includes gate neurons and a continuity unit, the gate neurons being configured, when activated by the shift selector, to transfer the burst signals received from the input interface to the continuity unit, the continuity unit being configured, when the transferred burst signals are input, to activate one or more neurons corresponding to the features respectively corresponding to the transferred burst signals, the continuity unit being further configured to continuously output the spike signals respectively corresponding to the features until a reset signal is input.

The other aspect of the device may further provide that an amount of the gate neurons is equal to an amount of features corresponding to input spike signals received by the input interface.

The other aspect of the device may further provide that the continuity unit includes continuity neurons for each of the features and one or more inhibitory neurons, the continuity neurons being configured to continuously output the spike signals respectively corresponding to the features when the transferred burst signals are received, the inhibitory neurons being configured to suppress the continuity neurons so that only one type of the spike signals is output per output.

The other aspect of the device may further provide that, when the reset signal is received, the inhibitory neuron initializes the continuity unit to interrupt the spike signals being continuously output.

The other aspect of the device may further provide that the shift selector includes selection neurons, shift selection neurons, one or more inhibitory neurons, and a control neuron, the selection neurons being configured, when activated, to continuously output the activation signal to activate the gate neurons included in the selected one of the MEs, the shift selection neurons being configured to activate a subsequent one of the selection neurons when one of the multiplexed burst signals is received from the multiplexer, the inhibitory neurons being configured to suppress the selection neurons so that the subsequent one of the selection neurons outputs an activation signal, the control neuron being configured to continuously output a signal that suppresses the shift selection neurons.

The other aspect of the device may further provide that the subsequent one of the selection neurons receives a reset signal, and the subsequent one of the selection neurons continuously transmits the activation signal to the gate neurons included in the selected one of the MEs.

The other aspect of the device may further provide that the control neuron continuously outputs a signal suppressing the gate neurons included in each of the MEs.

Other features and aspects may be apparent from the following detailed description, the drawings, and the claims.

BRIEF DESCRIPTION OF THE DRAWINGS

FIG. 24 is a diagram illustrating an example of a pattern of activated neurons of MEs for each time marked on FIG. 20.

Figure 1:
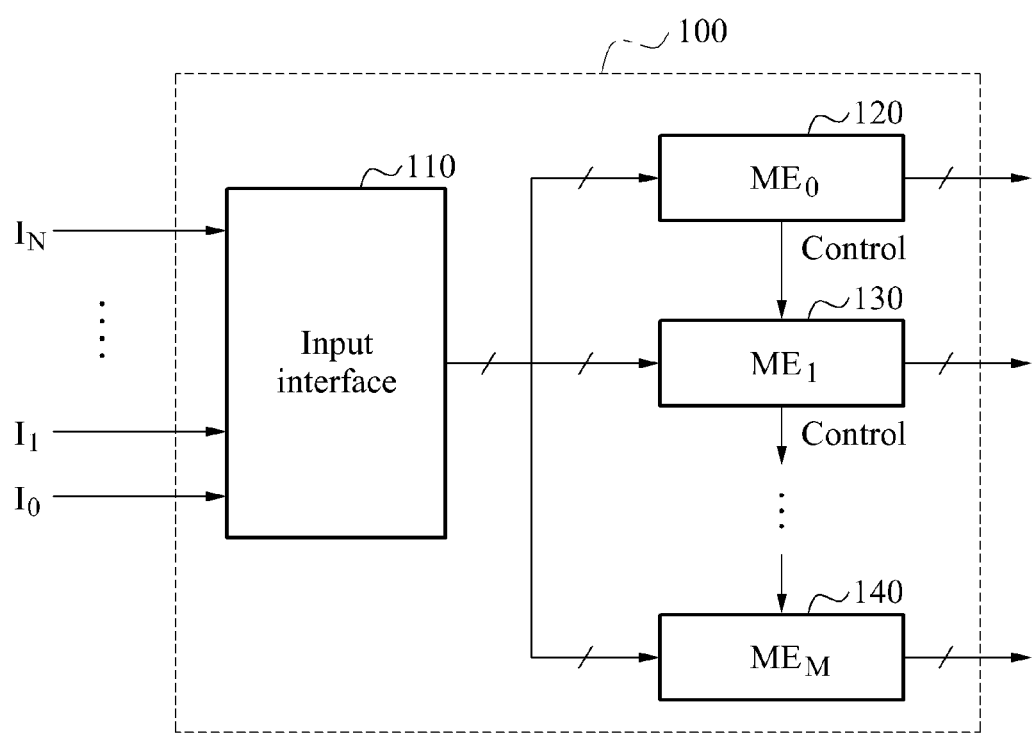
FIG. 1 is a diagram illustrating an example of a working memory device.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. In addition, descriptions of well-known functions and constructions may be omitted for increased clarity and conciseness.

Throughout the specification, a device that temporarily stores a pattern, varying over time, during a desired time through use of a neuron circuit, may be referred to as a working memory device.

FIG. 1 illustrates an example of a working memory device 100. Referring to FIG. 1, the working memory device 100 includes an input interface 110 and one or more memory elements (MEs), including a zeroth ME ($ME_0$) 120, a first ME ($ME_1$) 130, and an $M^{th}$ ME ($ME_M$) 140.

The input interface 110 may convert an input spike input by one of a plurality of neurons into a burst spike having a predetermined form. The input interface 110 may output the burst signal. The input interface 110 may convert a series of spike signals into a burst structure having a predetermined time slot, regardless of a spike rate and a spike length.

The MEs 120, 130, and 140 may be sequentially activated. An activated one of the MEs 120, 130, and 140 may store an input value corresponding to the outputted burst signal. When the input value is stored in the activated one of the MEs 120, 130, and 140, the activated one of the MEs 120, 130, and 140 may be deactivated and activate a subsequent one of the MEs 120, 130, and 140. That is, the MEs 130 and 140, except for the $ME_0$ 120, may be activated by a previous ME. The one of the MEs 120, 130, and 140 storing the input value corresponding to the burst signal may continuously output a spike signal corresponding to the input value until the respective ME is initialized by a reset signal.

Figure 2:
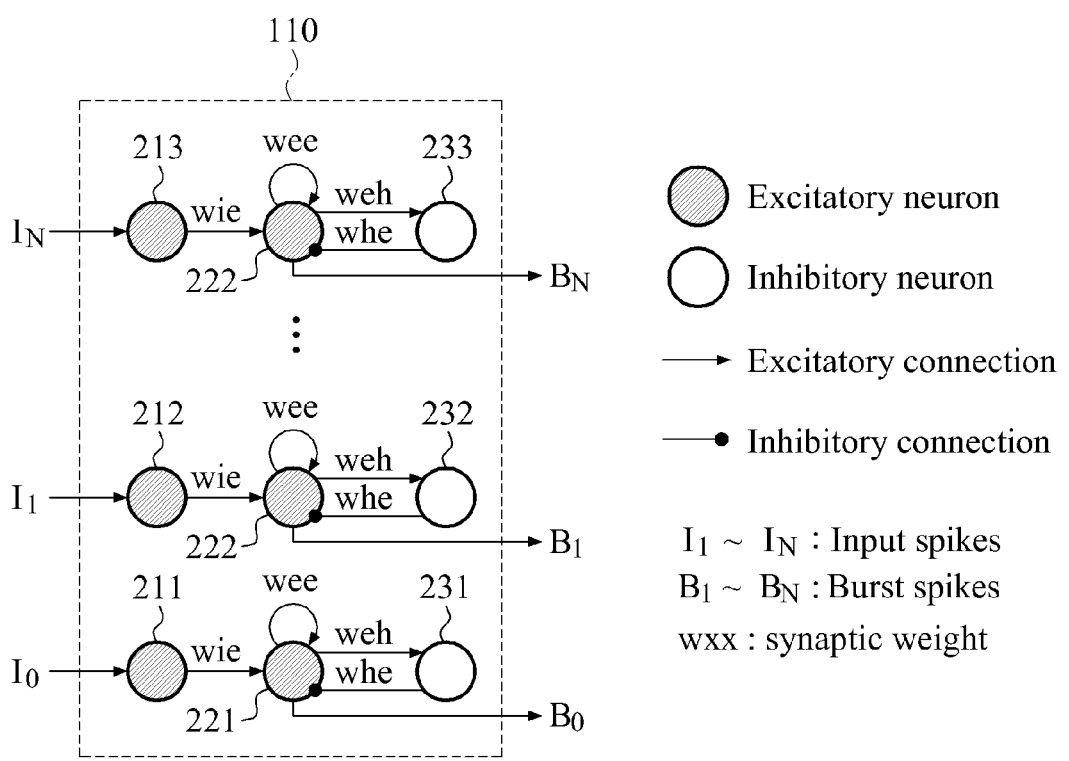
FIG. 2 is a diagram illustrating an example of a configuration of an input interface of a working memory device.

FIG. 2 illustrates an example of a configuration of the input interface 110 of the working memory device 100. Referring to FIG. 2, the input interface 110 may include two excitatory neurons and a single inhibitory neuron per input. In this example, excitatory neurons 211, 212, and 213, disposed on an input side to remove noise, may be omitted. Hereinafter, an excitatory neuron to remove noise 211, 212, and 213 may be referred to as a noise removal neuron. When the noise removal neurons 211, 212, and 213 are omitted, the input interface 110 may include a single excitatory neuron and a single inhibitory neuron per input.

Figure 4:
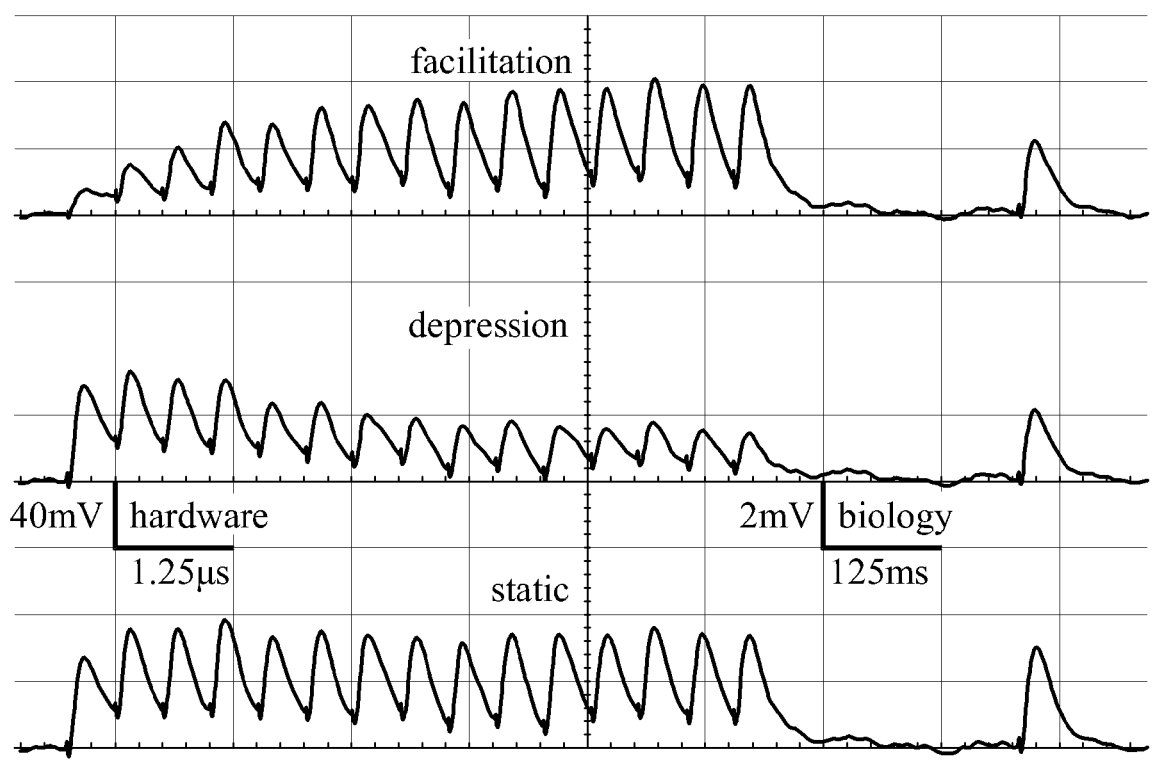
FIG. 4 is a diagram illustrating an example of a type of a short-term plasticity (STP) that may be included in a synapse.

FIG. 4 illustrates an example of a type of a short-term plasticity (STP) that may be included in a synapse. When the noise removal neurons 211, 212, and 213 are included in FIG. 2, an input and one of the noise removal neurons 211, 212, and 213 may be connected by a synapse having a short-term facilitation function to remove noise. The STP of the synapse indicates a change in strength of successive spike signals that are transferred by the synapse.

Referring to FIG. 4, the synapse may have one of a plurality of characteristics including facilitation, depression, and a characteristic of being static. The facilitation of the synapse refers to a characteristic that performs transferring with a low strength, at first, when successive spike signals are input, and gradually increases the strength of the transfer. The depression of the synapse refers to a characteristic that performs transferring with a high strength, at first, when successive spike signals are input, and gradually decreases the strength of the transfer. The characteristic of being static refers to a characteristic that performs transferring successive spike signals at a predetermined strength.

Figure 3:
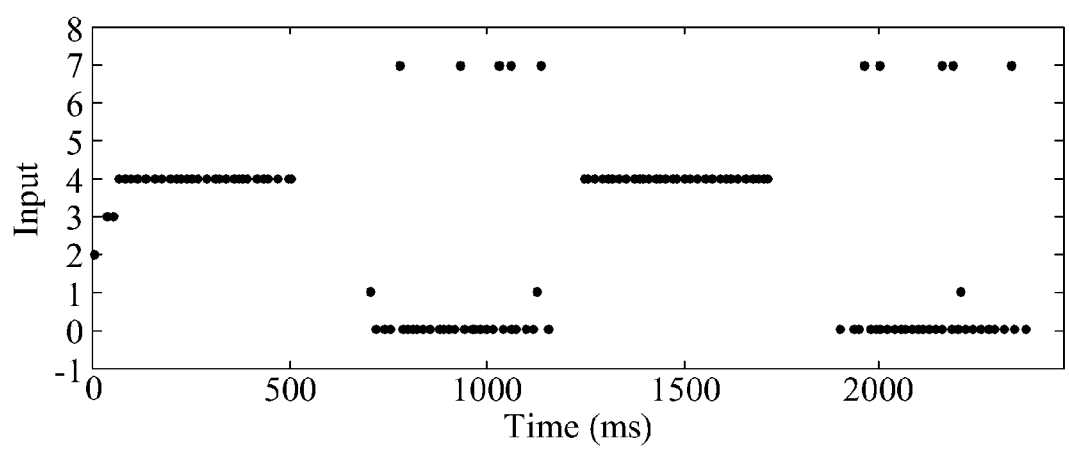
FIG. 3 is a diagram illustrating an example of input and output being performed by a noise removal neuron in an input interface.
Figure 3:
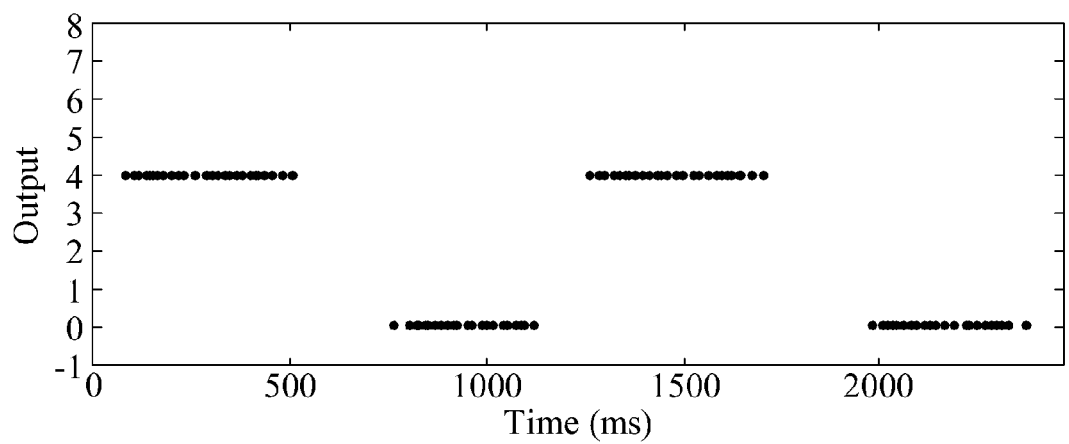

Referring once more to FIG. 2, the noise removal neurons 211, 212, and 213 may remove noise using a spike signal input by a synapse having a short-term facilitation characteristic, as illustrated in FIG. 3. FIG. 3 illustrates an example of input and output being performed by one of the noise removal neurons 211, 212, and 213 in the input interface 110. Referring to FIG. 3, when an input including one or two spikes is input, noise may be removed by a synapse having a short-term facilitation characteristic and by one of the noise removal neurons 211, 212, and 213. As a result, only a signal including a plurality of spikes may be output.

Regardless of a spike rate and a spike length, the input interface 110 may convert successive input spike signals into a burst signal of a burst structure having a predetermined time slot using one of the excitatory neurons 221, 222, and 223 and one of the inhibitory neurons 231, 232, and 233 per input. Then, the input interface 110 may output the burst signal.

For example, one of the excitatory neurons 221, 222, and 223 may change an input spike signal into a burst structure having a predetermined time slot. One of the inhibitory neurons 231, 232, and 233 may suppress a corresponding one of the excitatory neurons 221, 222, and 223 to enable a burst signal generated by the excitatory neuron to have a predetermined size. The input interface 110 includes a single neuron for each input value through use of a neuron that operates in a burst mode.

Figure 5:
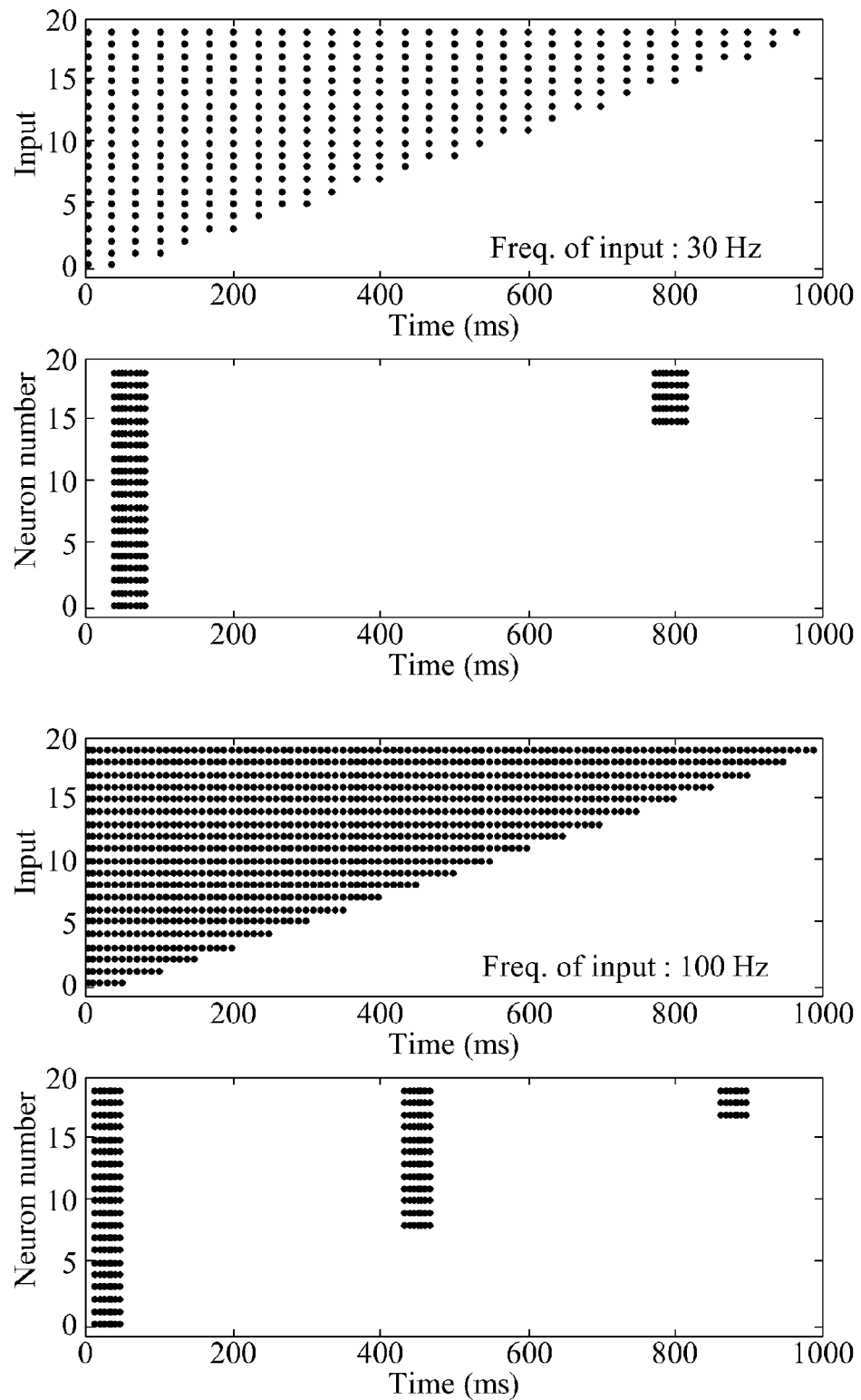
FIG. 5 is a diagram illustrating an example of input and output being performed by an input interface based on a spiking rate of an input signal in a working memory device.

When an input having a long length is input, the input interface 110 may output a burst signal at appropriate time intervals to indicate that an input state is maintained. FIG. 5 illustrates an example of input and output being performed by the input interface 110 based on a spiking rate of an input signal in the working memory device 100. Referring to FIG. 5, the input interface 110 may output a burst signal at appropriate time intervals to indicate that an input state is maintained even in view of an input having a long length. In this example, when a spike rate of an input spike is high, that is, when a number of spikes input at a particular time is high, a time interval to output a burst signal may be shortened. When a spike rate is low, a time interval for outputting a burst signal may be extended. In this manner, information associated with a spike rate of an input having a long length may be expressed.

Figure 6:
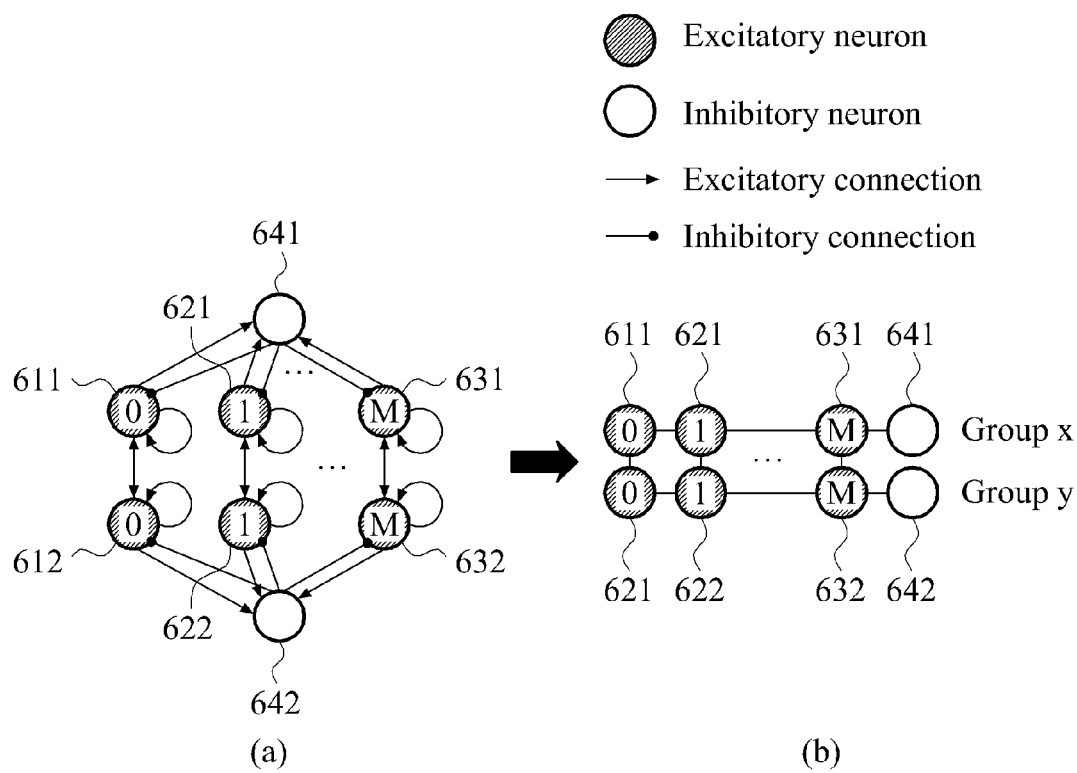
FIG. 6 is a diagram illustrating an example of a structure of a coupled recurrent network that maintains an input state.

Hereinafter, a structure of a network that, once the network is activated, maintains an activated state without input will be described with reference to FIGS. 6 and 7. FIG. 6 illustrates an example of a structure of a coupled recurrent network that maintains an input state. Referring to FIG. 6, a structure of the coupled recurrent network is illustrated on the left of FIG. 6, and a simple structure of the coupled recurrent network is illustrated on the right of FIG. 6. Hereinafter, the structure of the coupled recurrent network may be expressed as the simple structure.

The coupled recurrent network may be configured by coupling two recurrent networks. The two recurrent networks are classified into Group X and Group Y. A recurrent network of Group X may include one or more inhibitory neurons 641 and one or more excitatory neurons 611, 621, and 631. A recurrent network of Group Y may include at least one inhibitory neuron 642 and a plurality of excitatory neurons 612, 622, and 632. The excitatory neurons 611, 621, and 631 of Group X and the excitatory neurons 612, 622, and 632 of Group Y pair with one another for coupling. The paired excitatory neurons may alternately output a spike signal to maintain an input spike signal.

Here, a synapse of an excitatory neuron in the coupled recurrent network may include α-amino-3-hydroxy-5-methylisoxazole-4-propionic acid (AMPA) receptors. Here, the synapse including the AMPA receptors may have a reaction velocity in a range from about 1 ms to 5 ms with respect to a spike signal.

Figure 7:
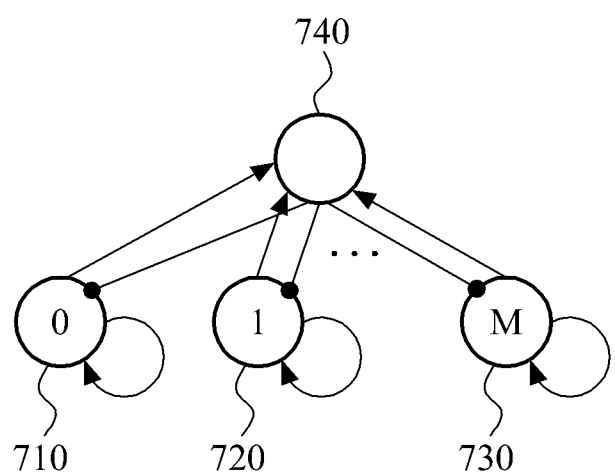
FIG. 7 is a diagram illustrating an example of a structure of a recurrent network that maintains an input state.

FIG. 7 illustrates an example of a structure of a recurrent network that maintains an input state. Referring to FIG. 7, the recurrent network includes one or more inhibitory neurons 740 and one or more excitatory neurons 710, 720, and 730. The recurrent network may use a synapse having a significantly low reaction velocity as a recurrent-connected synapse of one of the excitatory neurons 710, 720, and 730 to maintain an input spike signal merely using the recurrent network.

With respect to FIG. 7, the recurrent connection refers to a connection that loops back to a source. Examples of the synapse having the aforementioned significantly low reaction velocity may include a synapse including N-Methyl-D-aspartic acid (NMPA) receptors. In this example, the synapse including the NMPA receptors may have a reaction velocity of about at least 80 ms with respect to a spike signal.

Figure 8:
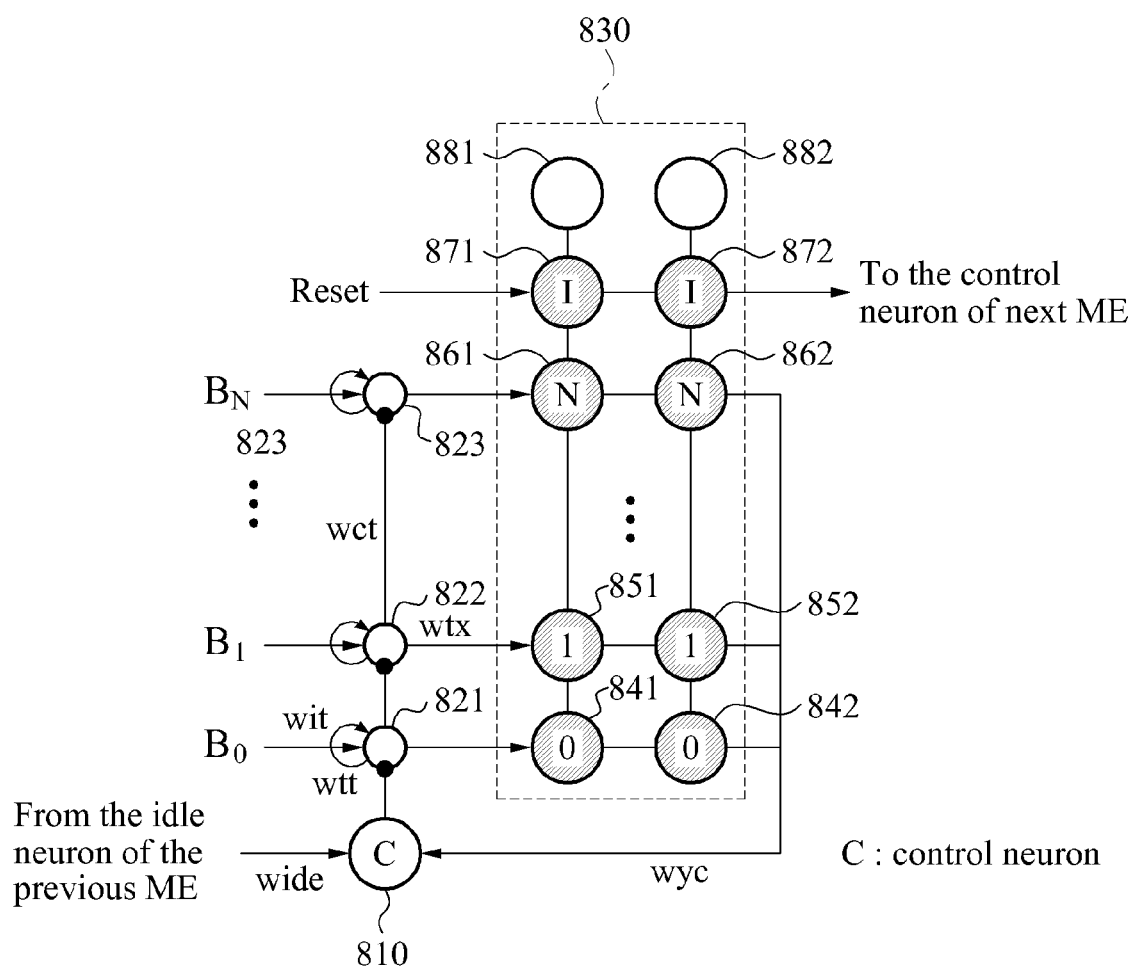
FIG. 8 is a diagram illustrating an example of a configuration of a memory element (ME) in a working memory device.

FIG. 8 illustrates an example of a configuration of one of the MEs 120, 130, and 140 in the working memory device 100. Referring to FIG. 8, one of the MEs 120, 130, and 140 of FIG. 1 includes an excitatory neuron 810 (hereinafter referred to as a control neuron 810) to perform controlling, excitatory neurons 821, 822, and 823 (hereinafter referred to as gate neurons 821, 822, and 823) to function as gates, and a continuity unit 830.

Each of the gate neurons 821, 822, and 823 correspond to a neuron that is activated or suppressed by the control neuron 810. Each of the gate neurons 821, 822, and 823 may transfer an input burst signal to a corresponding neuron in the continuity unit 830. In this example, a number of the gate neurons may be equal to a number of inputs that the input interface 110 is able to receive. That is, there may be a gate neuron per input.

When a burst signal is input to the continuity unit 830, the continuity unit 830 may activate one or more neuron corresponding to the burst input so that a spike signal may be continuously output until a reset signal is input.

The continuity unit 830 is a coupled recurrent network that is formed by coupling two recurrent networks, that is, Group X and Group Y. Group X includes excitatory neurons 841, 851, 861, and 871 and an inhibitory neuron 881. The excitatory neurons 841, 851, and 861 correspond to respective inputs and are hereinafter referred to as continuity neurons 841, 851, and 861. The excitatory neuron 871 outputs an idle state based on a reset signal and is hereinafter referred to as an idle neuron 871. The inhibitory neuron 881 may suppress the continuity neurons 841, 851, and 861 and the idle neuron 871 when a spike signal is output from the continuity neurons 841, 851, and 861, the idle neuron 871, or any combination thereof.

In addition, Group Y is coupled with Group X. Group Y includes continuity neurons 842, 852, and 862, an idle neuron 872, and an inhibitory neuron 882. Continuity neurons 842, 852, and 862 and the idle neuron 872 are excitatory neurons to correspond with the excitatory neurons 841, 851, 861, and 871 of Group X.

When a reset signal is input, the idle neurons 871 and 872 in the continuity unit 830 may be alternately activated. As a result, the continuity unit 830 may output an idle signal to a subsequent ME to deactivate the subsequent ME.

When a burst signal is received through one of the gate neurons 821, 822, and 823, the continuity unit 830 may use of a pair of continuity neurons corresponding to an input from among the continuity neurons 841, 851, 861, 842, 852, and 862 to maintain an output state by alternately outputting a spike signal through the pair continuity neurons. In this example, the continuity unit 830 may maintain an output state using only a pair of continuity neurons through use of the inhibitory neurons 881 and 882.

Here, outputs by the continuity neurons 841, 851, 861, 842, 852, and 862 in the continuity unit 830 may be provided as inputs of the control neuron 810. The control neuron 810 may activate or suppress the gate neurons 821, 822, and 823 to activate or deactivate the ME. The control neuron 810 may suppress the gate neurons 821, 822, and 823 to deactivate the gate neurons 821, 822, and 823 when an idle signal is received from an idle neuron of a previous ME. The control neuron 810 may interrupt suppressing of the continuity neurons 841, 851, 861, 842, 852, 862 to activate the ME when a burst signal is stored in the previous ME and an outputting of an idle signal from the previous ME is interrupted.

Subsequently, the control neuron 810 may suppress the gate neurons 821, 822, and 823 to deactivate the gate neurons 821, 822, and 823 when a spike signal is received from at least one of the continuity neurons 841, 851, 861, 842, 852, and 862 in the continuity unit 830. That is, when the control neuron 810 receives an idle signal from an idle neuron of the previous ME or receives a spike signal from one or more of the continuity neurons 841, 851, 861, 842, 852, and 862 of the continuity unit 830, the control neuron 810 may suppress the gate neurons 821, 822, 823 to deactivate the gate neurons 821, 822, 823. Otherwise, when no input is received, the control neuron 810 may activate the gate neurons 821, 822, and 823.

Although the continuity unit 830 of FIG. 8 is configured as a form of the coupled recurrent network of FIG. 6, the continuity unit 830 may be configured as a form of the recurrent network of FIG. 7.

Figure 9:
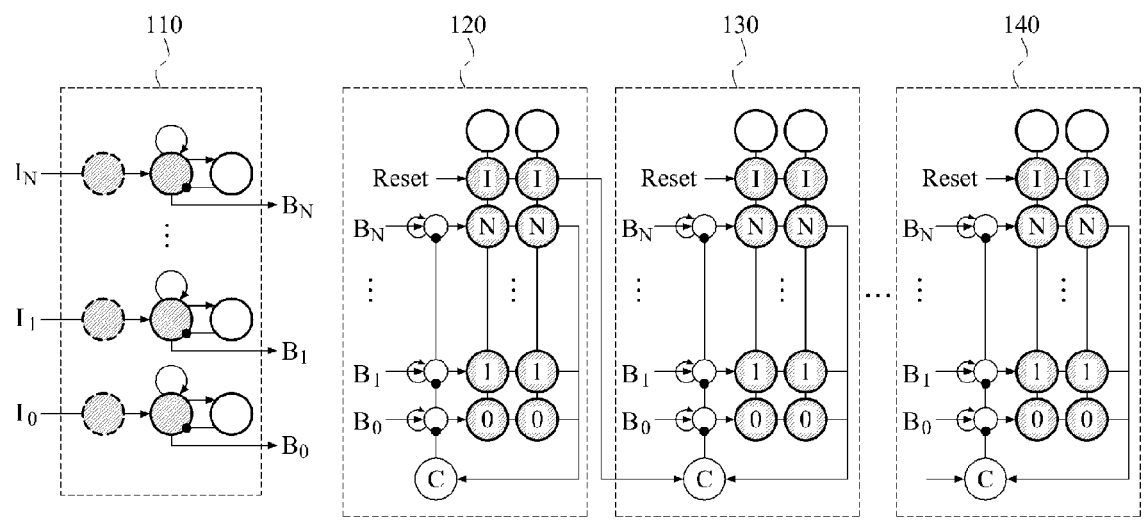
FIG. 9 is a diagram illustrating an example of a configuration of a working memory device including spiking neurons.

FIG. 9 illustrates an example of a configuration of the working memory device 100 including spiking neurons. The working memory device 100 may be configured as shown in FIG. 9 using the neurons described in the foregoing with reference to FIGS. 2 and 8. A configuration of each unit has been described in the foregoing with reference to FIGS. 2 and 8. As a result, detailed descriptions thereof will be omitted for conciseness and clarity of description.

Figure 10:
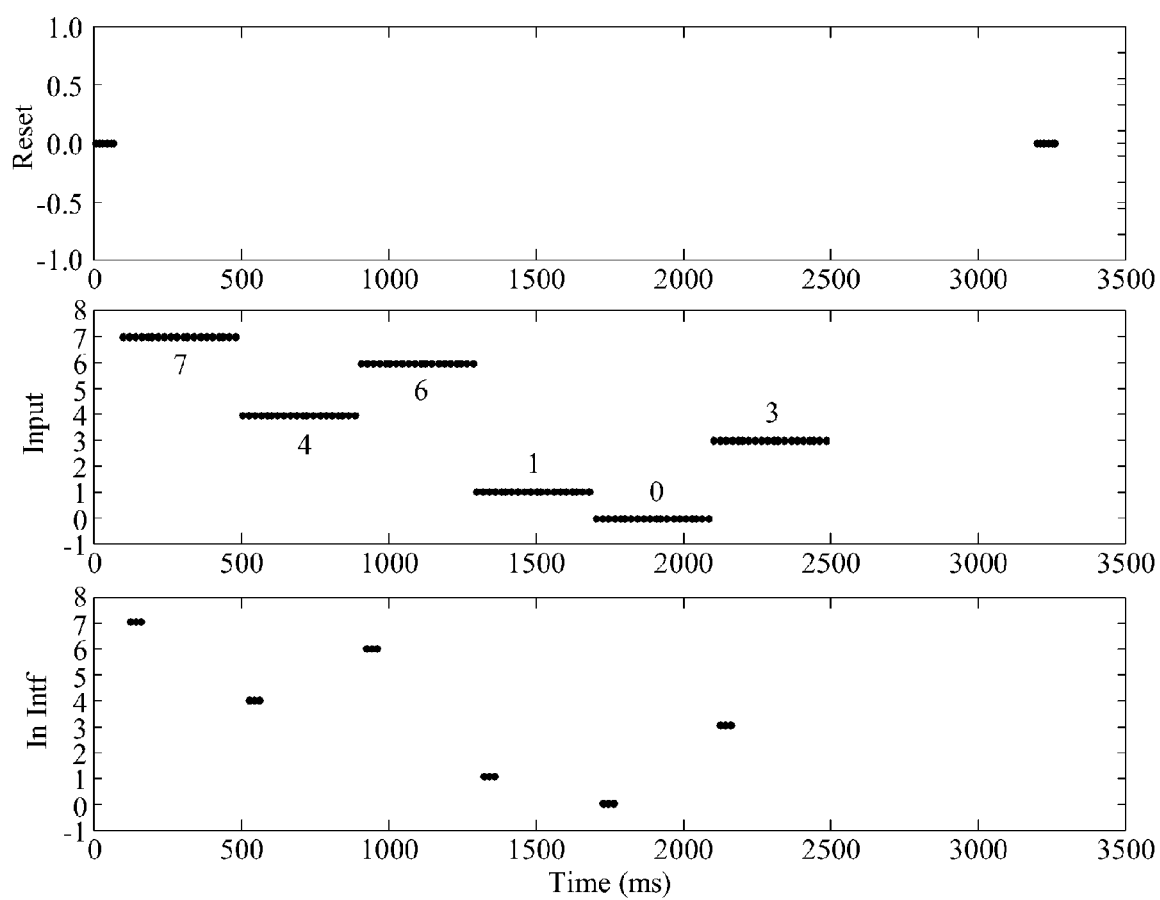
FIG. 10 is a diagram illustrating an example of input and output being performed by an input interface of the working memory device of FIG. 9.
Figure 11:
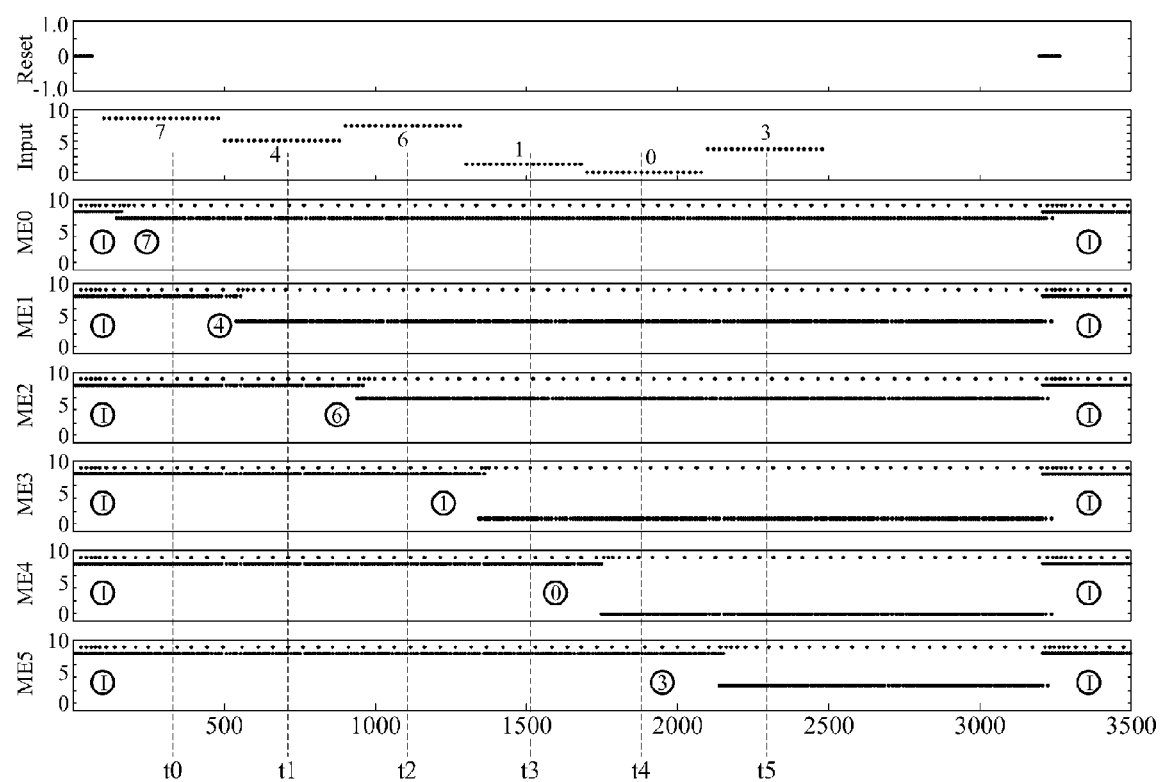
FIG. 11 is a diagram illustrating an example of output being performed by MEs of the working memory device of FIG. 9.
Figure 12:
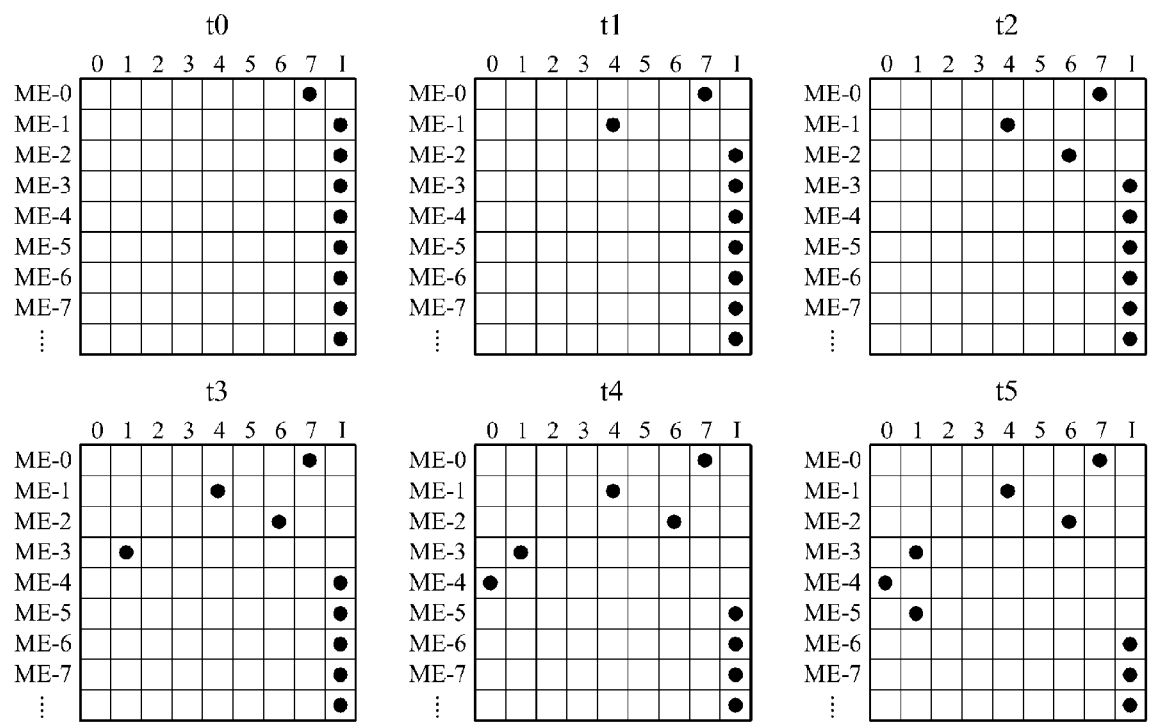
FIG. 12 is a diagram illustrating an example of a pattern of activated neurons of MEs for each time marked on FIG. 11.

An example of input and output being performed by each unit when values of 7, 4, 6, 1, 0, and 3 are sequentially input to the working memory device 100 of FIG. 9 will be described with reference to FIGS. 10, 11, and 12. FIG. 10 illustrates an example of input and output being performed by the input interface 110 of the working memory device 100 of FIG. 9. FIG. 11 illustrates an example of output performed by the MEs 120, 130, and 140 of the working memory device 100 of FIG. 9. FIG. 12 illustrates an example of a pattern of activated neurons of MEs for each time marked on FIG. 11.

Referring to FIG. 10, an input spike signal is converted into a burst signal having a predetermined time slot, and the burst signal is output. In FIG. 10, 'Reset' denotes a spike signal to initialize the MEs 120, 130, and 140, 'Input' denotes a spike signal input to the input interface 110, and 'In Intf' denotes a burst signal output from the input interface 110.

Referring to FIG. 11, features corresponding to spike signals may be sequentially stored in the $ME_0$ 120 through the $ME_5$, and each ME may continuously output a spike signal corresponding to a stored input until a reset signal is input. In FIG. 11, 'Reset' denotes a spike signal to initialize the MEs 120, 130, and 140, 'Input' denotes a spike signal input to the input interface 110, 'ME0' through 'ME5' denote spike signals output from the $ME_0$ 120 through a fifth ME ($ME_5$), and an output, expressed by 'I', among outputs of the 'ME0' through 'ME5' denotes an idle signal.

Referring to a state of an ME in each time, t0 through t5, as shown in FIGS. 11 and 12, a working memory that converts a spatio-temporal pattern of a spike signal that varies over time into a spatio pattern may be recognized.

Figure 13:
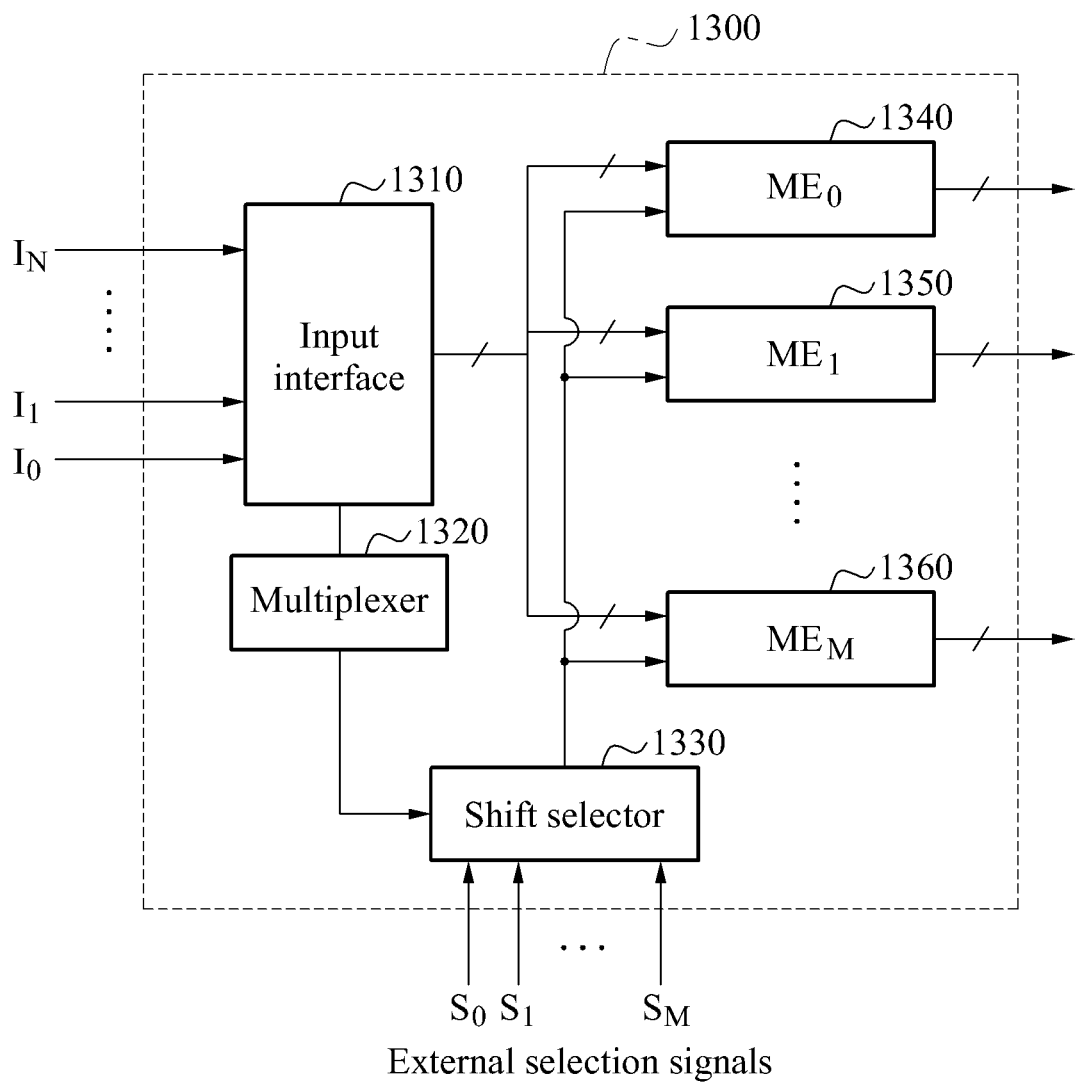
FIG. 13 is a diagram illustrating another example of a working memory device.

FIG. 13 illustrates another example of a configuration of a working memory device. Referring to FIG. 13, the working memory device may include an input interface 1310, a multiplexer 1320, a shift selector 1330, and a plurality of MEs, for example, a zeroth ME ($ME_0$) 1340, a first ME ($ME_1$) 1350, and an $M^{th}$ ME ($ME_M$) 1360.

The input interface 1310 may convert input spike input by one of a plurality of neurons into a burst spike having a predetermined form. The input interface 1310 may output the burst signal. The input interface 1310 may convert a series of spike signals into a burst structure having a predetermined time slot, regardless of a spike rate and a spike length. The input interface 1310 may be configured to be the same as the input interface 110 of FIG. 1.

The multiplexer 320 may multiplex the burst signal output from the input interface 1310 into a burst signal having a predetermined value to provide the multiplexed burst signal to the shift selector 1330.

The shift selector 1330 may select, from among the MEs 1340, 1350, and 1360, an ME to which the burst signal is to be stored when the input interface 1310 outputs the burst signal. The shift selector 1330 may output an activation signal to activate the selected ME. The shift selector 1330 may select the ME based on two schemes. A first scheme may enable selection of a subsequent ME every time a multiplexed burst signal is received from the multiplexer 1320. A second scheme may enable selection of an ME corresponding to a selection signal when one of external selection signals S0, S1, and SM is received. In this example, a number of types of the external selection signals may be equal to a number of MEs.

One of the MEs 1340, 1350, and 1360 may be activated in response to the selection of the shift selector 1330, and an activated ME may store a burst signal output from the input interface 1310. The ME storing the burst signal may continuously output a spike signal corresponding to an input value until the ME is initialized by a reset signal.

Figure 14:
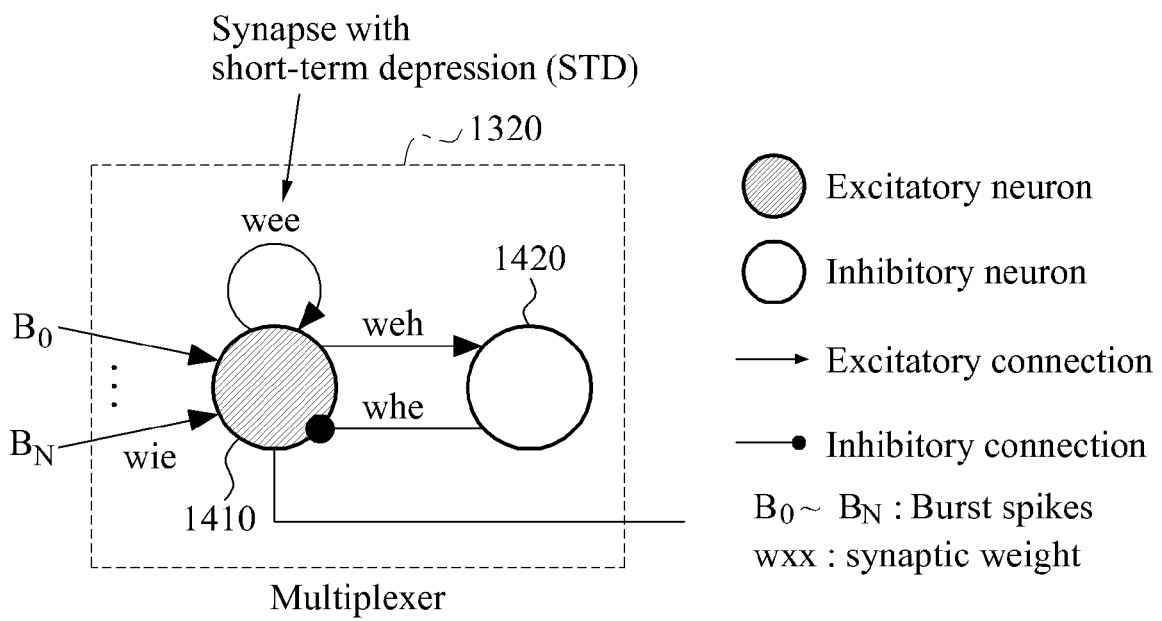
FIG. 14 is a diagram illustrating an example of a configuration of a multiplexer in the working memory device of FIG. 13.

FIG. 14 illustrates an example of a configuration of the multiplexer 1320 in the working memory device of FIG. 13. Referring to FIG. 14, the multiplexer 1320 may convert all burst signals input through an excitatory neuron 1410 and an inhibitory neuron 1420 into burst signals having a predetermined value and a predetermined time slot, and may output the burst signals to the shift selector 1330. For example, the excitatory neuron 1410 may convert an input burst signal to have a burst structure having a predetermined value. The inhibitory neuron 1420 may suppress the excitatory neuron 1410 to enable the burst-structured spike signal generated by the excitatory neuron 1410 to have a predetermined size. To generate the burst-structured spike signal from the excitatory neuron 1410, a STP of a synapse that connects the excitatory neuron 1410 to the excitatory neuron 1410 itself has a depression characteristic.

Figure 15:
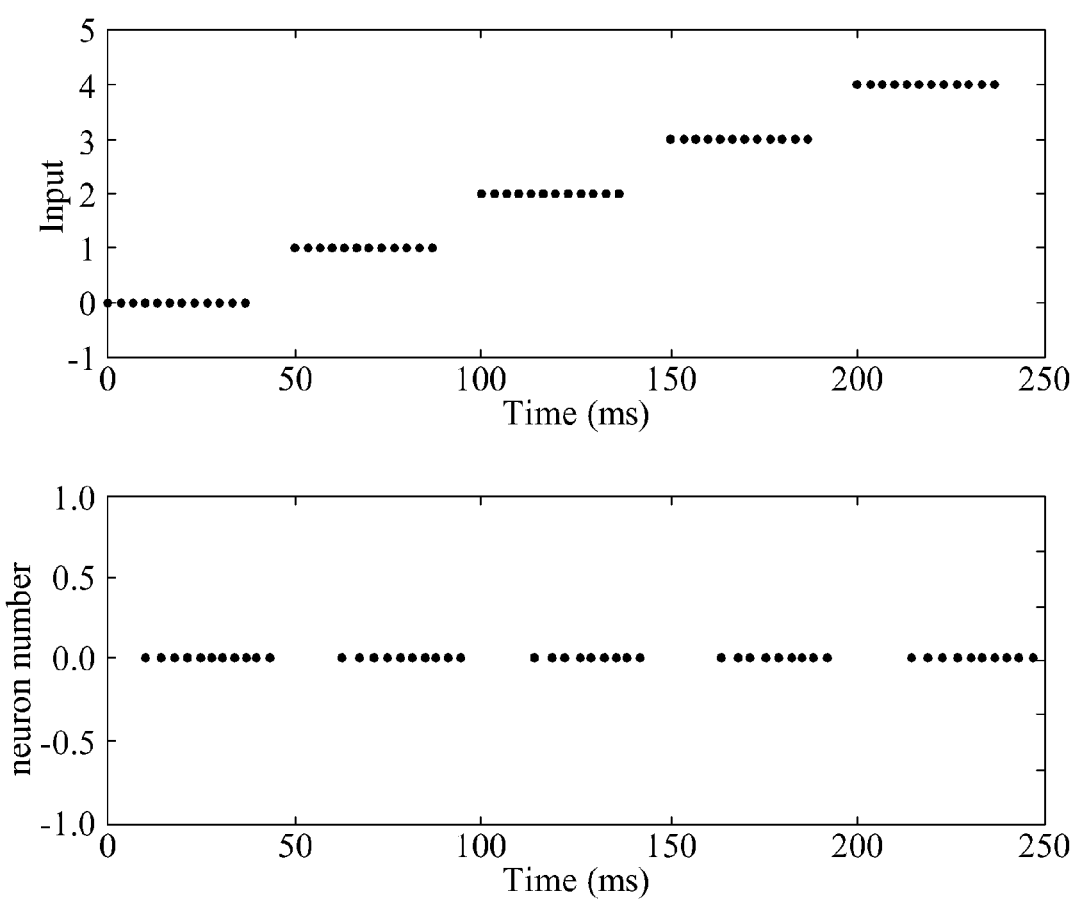
FIG. 15 is a diagram illustrating an example of input and output being performed by the multiplexer of FIG. 14.

FIG. 15 illustrates an example of input and output being performed by the multiplexer 1320 of FIG. 14. Referring to FIG. 15, although burst signals having values of 0, 1, 2, 3, and 4 are input to the multiplexer 1320 as inputs, the burst signals may be output after being multiplexed to have a value of 0.0.

Figure 16:
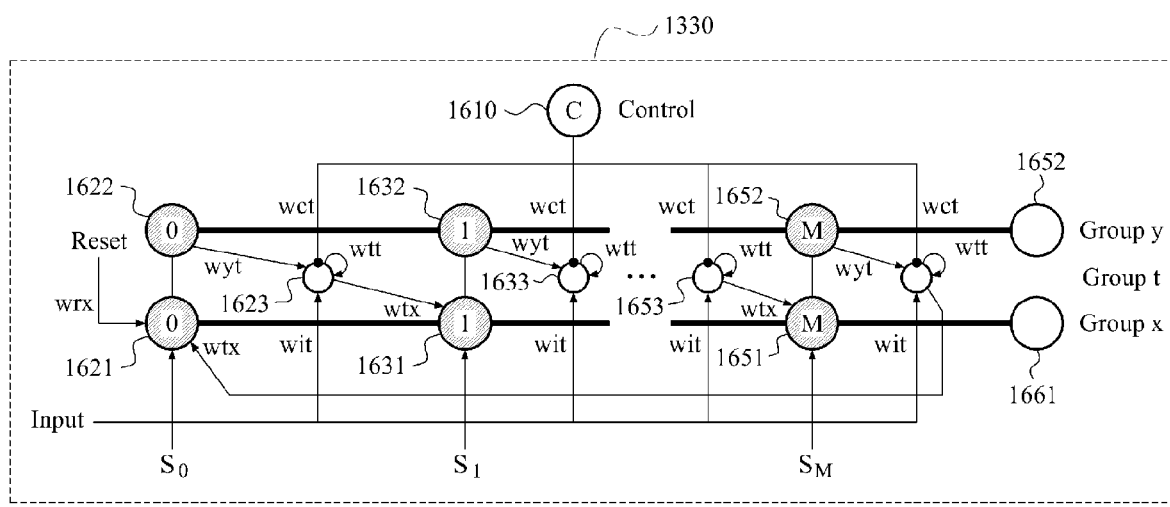
FIG. 16 is a diagram illustrating an example of a configuration of a shift selector in the working memory device of FIG. 13.

FIG. 16 illustrates an example of a configuration of the shift selector 1330 in the working memory device of FIG. 13. Referring to FIG. 16, the shift selector 1330 may be configured based on the coupled recurrent network of FIG. 7. The shift selector 1330 may be configured as shown in FIG. 16 because a predetermined neuron group activated by an input of a coupled recurrent network continuously maintains an activated state even when the input is absent, so that the MEs 1340, 1350, and 1360 are sequentially activated.

The shift selector 1330 includes Group X, Group Y, Group t, and an inhibitory neuron 1610, hereinafter referred to as a control neuron 1610, to continuously output a suppressive spike signal. The control neuron 1610 may continuously output a signal to suppress neurons included in Group t. The control neuron 1610 may continuously output a signal to suppress gate neurons included in each ME, for example, the MEs 1340, 1350, and 1360.

Group X includes excitatory neurons 1621, 1631, and 1651, hereinafter referred to as selection neurons 1621, 1631, and 1651, and an inhibitory neuron 1661. In this example, the selection neurons 1621, 1631, and 1651 may select the MEs 1340, 1350, and 1360, respectively. The inhibitory neuron 1661 may suppress all selection neurons 1621, 1631, and 1651 when a spike signal is output from one or more of the selection neurons 1621, 1631, and 1651. Group Y, coupled with Group X, includes excitatory neurons 1622, 1632, and 1652, hereinafter referred to as selection neurons 1622, 1632, and 1652, and an inhibitory neuron 1662. Group t includes excitatory neurons 1623, 1633, and 1653, hereinafter referred to as shift selection neurons 1623, 1633, and 1653, that output a spike signal to a subsequent selection neuron included in Group X when a multiplexed burst signal is received from the multiplexer 1320 and a spike signal is received from one of the selection neurons 1622, 1632, and 1652 in Group Y.

When a reset signal is input to a zeroth selection neuron 1621 of Group X, the zeroth selection neuron 1621 and a zeroth selection neuron 1622 of Group Y, which are paired, may be alternately activated. As a result, the shift selector 1330 may continuously output a spike signal to activate the $ME_0$ 1340. In this example, the above-referenced pair may be referred to as a selection neuron group.

Subsequently, the shift selector 1330 may change a selection neuron group to output a spike signal, through use of one of the shift selection neurons 1623, 1633, and 1653 included in Group t, every time a multiplexed burst signal is received from the multiplexer 1320. That is, the shift selection unit 1330 may activate selection neuron groups based on an order of $0^{th} \rightarrow 1^{st} \rightarrow 2^{nd} \rightarrow \ldots \rightarrow M^{th}$, and then may start activating a $0^{th}$ selection neuron group again. An activated selection neuron group may continuously output a spike signal to activate a corresponding ME.

The shift selector 1330 may also activate a predetermined selection neuron group selected by external selection signals S0, S1, and SM in addition to a multiplexed burst signal input by the multiplexer 1320. That is, when an external selection signal S0, S1, and SM corresponding to one of the selection neuron groups 1621, 1631, and 1651 of Group X is input, the shift selector 1330 may activate the selection neuron group corresponding to the external selection signal S0, S1, and SM.

Figure 17:
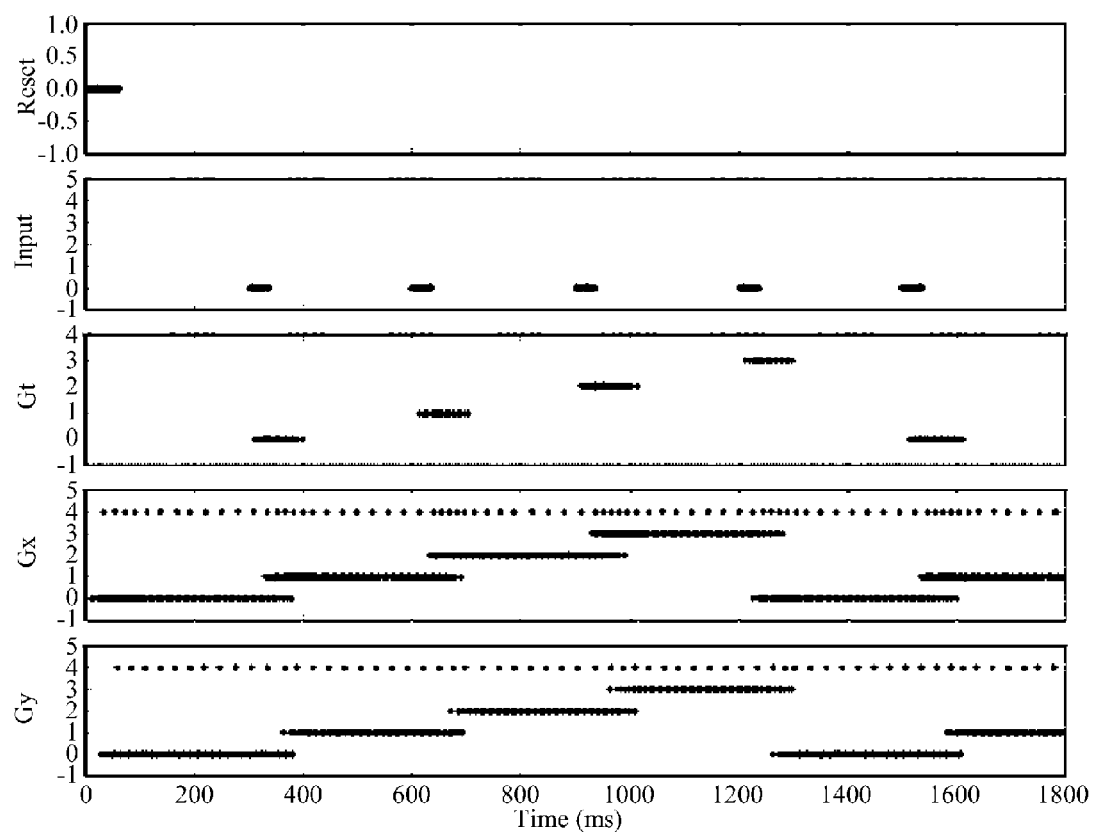
FIG. 17 is a diagram illustrating an example of input and output being performed by the shift selector of FIG. 16.

FIG. 17 illustrates an example of input and output being performed by the shift selector 1330 of FIG. 16. Referring to FIG. 17, values of outputs may sequentially increase based on inputs from the multiplexer 1320. In this instance, 'Reset' denotes a spike signal to initialize the MEs 1340, 1350, and 1360, 'Input' denotes a multiplexed burst signal input by the multiplexer 1320, 'Gx' denotes an output from selection neurons 1621, 1631, and 1651 and an inhibitory neuron 1661 included in Group X, 'Gy' denotes an output from selection neurons 1622, 1632, and 1652 and an inhibitory neuron 1662 included in Group Y, and 'Gt' denotes an output from shift selection neurons 1623, 1633, and 1653 included in Group t.

Figure 18:
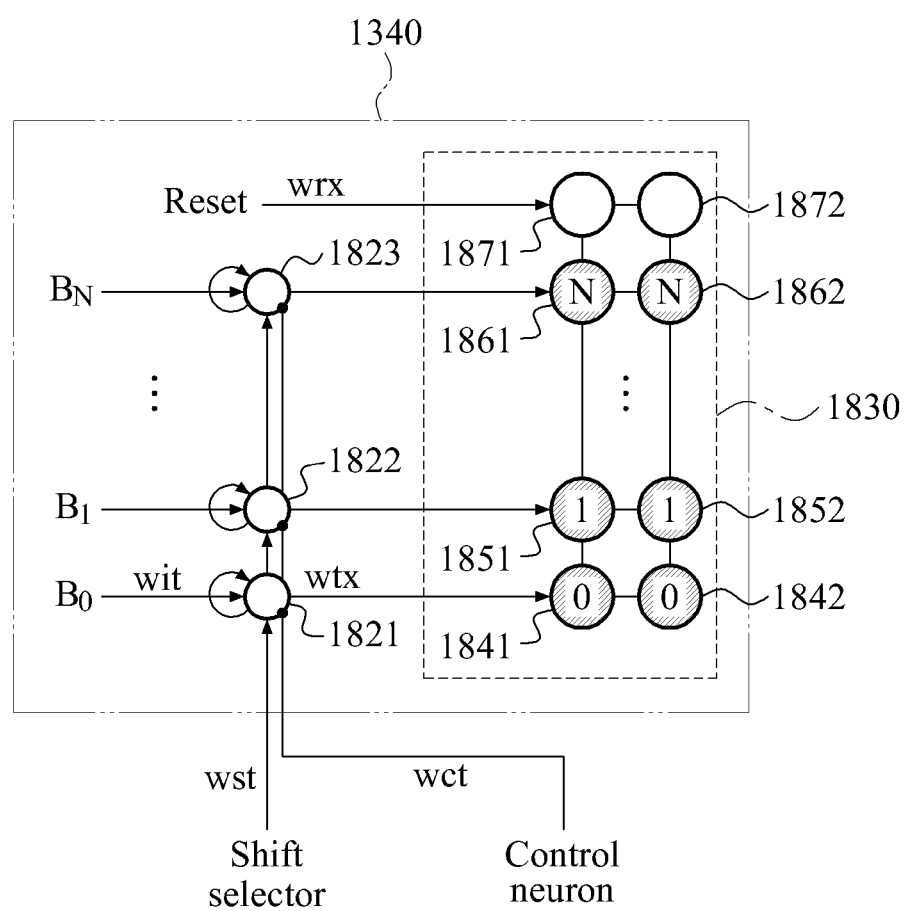
FIG. 18 is a diagram illustrating an example of a configuration of an ME in the working memory device of FIG. 13.

FIG. 18 illustrates an example of a configuration of an ME in the working memory device of FIG. 13. Referring to FIG. 18, the MEs 1340, 1350, and 1360 include gate neurons 1821, 1822, and 1823 and a continuity unit 1830. The gate neurons 1821, 1822, and 1823 may be suppressed by a control signal that is continuously received from the shift selector 1330 at regular intervals. The gate neurons 1821, 1822, and 1823 may transfer a burst signal input by the input interface 1310 to a corresponding neuron in the continuity unit 1830 when an activation spike signal from the shift selector 1330 is received along with a burst signal from the input interface 1310. When the burst signal is input, the continuity unit 1830 may activate at least one neuron corresponding to the input to continuously output a spike signal until a reset signal is input.

The continuity unit 1830 may be configured as a coupled recurrent network having a structure in which two recurrent networks, that is, Group X and Group Y, are coupled. Group X may include continuity neurons 1841, 1851, and 1861, and an inhibitory neuron 1871. The continuity neurons 1841, 1851, and 1861 correspond to inputs, respectively. The inhibitory neuron 1871 may suppress the continuity neurons 1841, 1851, and 1861 when a spike signal is output from one or more of the continuity neurons 1841, 1851, and 1861. In addition, the inhibitory neuron 1871 may suppress the continuity neurons 1841, 1851, and 1861 when a reset signal is received. Group Y, coupled with Group X, may include continuity neurons 1842, 1852, and 1862, and an inhibitory neuron 1872.

When a burst signal is received through one of the gate neurons 1821, 1822, and 1823, the continuity unit 1830 may output a spike signal by alternately using a pair of continuity neurons corresponding to an input from among the continuity neurons 1841, 1851, 1861, 1842, 1852, and 1862 to maintain an output state. In this example, the continuity unit 1830 may maintain the output state using only a pair of continuity neurons through use of the inhibitory neurons 1871 and 1872. The continuity unit 1830 may be deactivated when the inhibitory neurons 1871 and 1872 receive a reset signal.

When compared to the $ME_0$ 120 of FIG. 8, the $ME_0$ 1340 of FIG. 18 may omit an idle neuron group indicating an idle state in the $ME_0$ 120 of FIG. 8 and may use a signal received from the shift selector 1330 to activate or deactivate an ME, as opposed to using an internal control neuron. Since the $ME_0$ 1340 of FIG. 18 omits an idle neuron group, all continuity neuron groups may be deactivated at the initial state.

Figure 19:
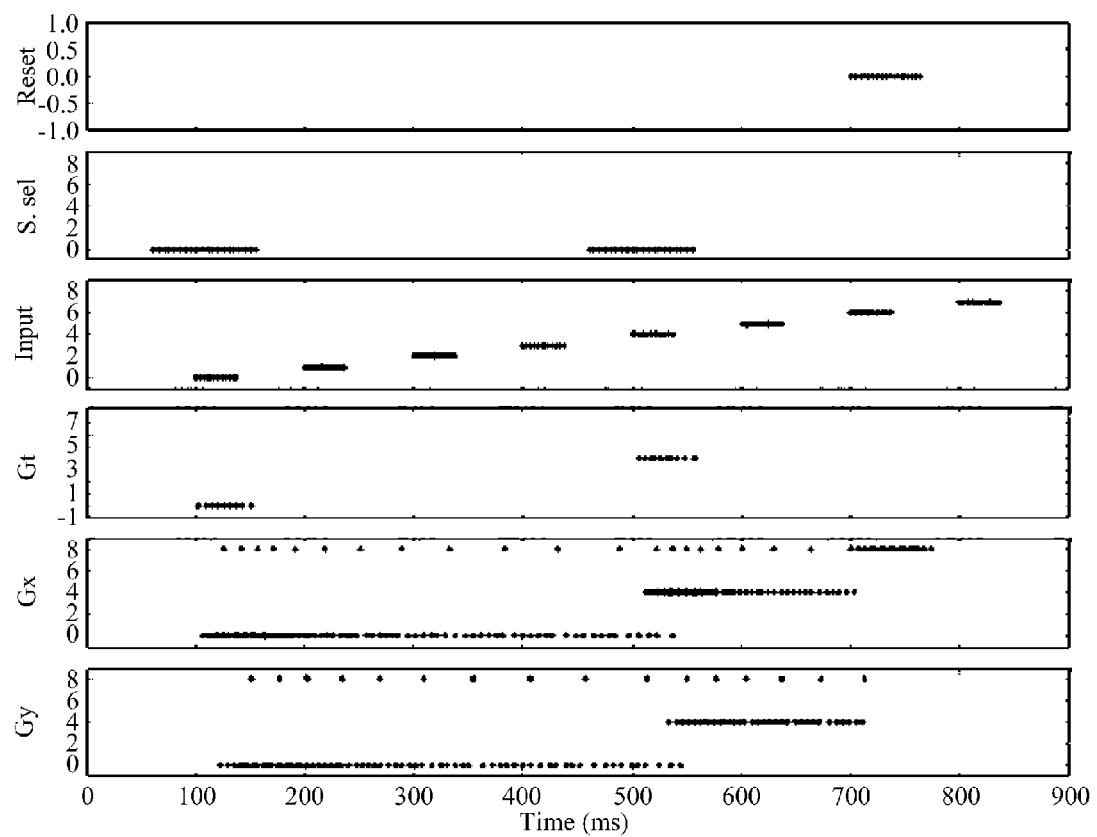
FIG. 19 is a diagram illustrating an example of input and output being performed by the MEs of FIG. 18.

FIG. 19 illustrates an example of input and output performed by the MEs 1340, 1350, 1360 of FIG. 18. In this instance, 'Reset' denotes a spike signal to initialize the MEs 1340, 1350, and 1360, 'Input' denotes a burst signal input by the input interface 1310, 'S.sel' denotes an activation signal from the shift selector 1330, 'Gt' denotes an output from shift selection neurons 1623, 1633, and 1653 included in Group t, 'Gx' denotes an output from the continuity neurons 1841, 1851, and 1861 and inhibitory neuron 1871 included in Group X of an ME, and 'Gy' denotes an output from the continuity neurons 1842, 1852, and 1862 and an inhibitory neuron 1872 included in Group Y of an ME.

FIG. 19 shows that the $ME_0$ 1340 and a fourth ME ($ME_4$) are activated by the shift selector 1330 sequentially when inputs of '0' and '4' are input to MEs that have eight inputs. Referring to FIG. 19, the MEs are deactivated at an initial state. When the $ME_0$ 1340 is activated by the shift selector 1330 and an input of '0' is input, $ME_0$ 1340 may output a spike signal corresponding to '0'. Subsequently, even though inputs of '1', '2', and '3' are input, a state of the MEs may not be changed since the MEs are not activated by the shift selector 1330. That is, when an ME is activated by the shift selector 1330, a corresponding input may be stored in the ME. However, when an ME is deactivated, the state of the ME may not be changed even though an input is input. When an input of '4' is newly input while the $ME_4$ is being activated by the shift selector 1330, the $ME_4$ may change a spike signal to output a spike signal corresponding to '4'. In addition, a state of the $ME_4$ may revert to the deactivated state by receiving a reset signal occurring at 700 ms.

Figure 20:
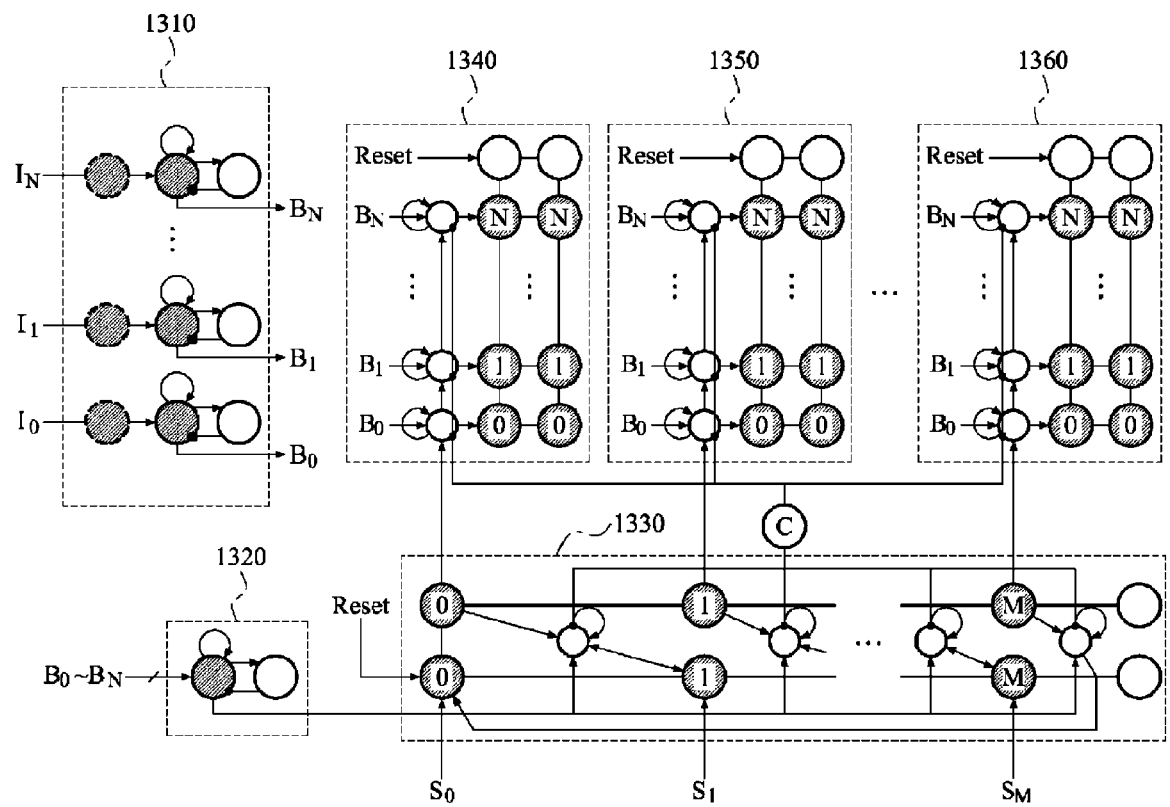
FIG. 20 is a diagram illustrating an example of a configuration of the working memory device of FIG. 13 including spiking neurons.

FIG. 20 is a diagram illustrating an example of a configuration of the working memory device of FIG. 13 including spiking neurons. The working memory device is configured as shown in FIG. 20 using the neurons described in the foregoing with reference to FIGS. 2, 14, 16, and 18. A configuration of each unit has been described in the foregoing with reference to FIGS. 2, 14, 16, and 18. As a result, detailed descriptions thereof will be omitted for conciseness and clarity of description.

Figure 21:
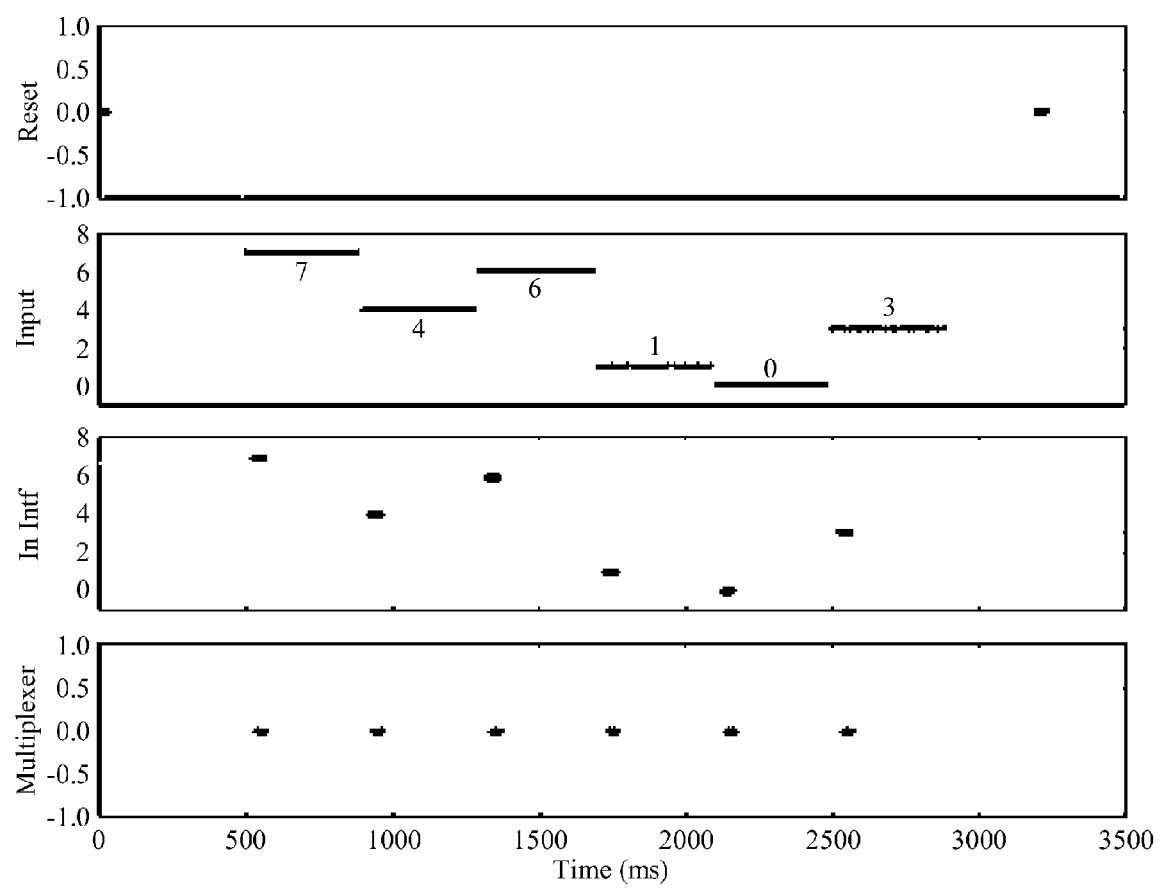
FIG. 21 is a diagram illustrating an example of input and output of an input interface and a multiplexer of the working memory device of FIG. 20.
Figure 22:
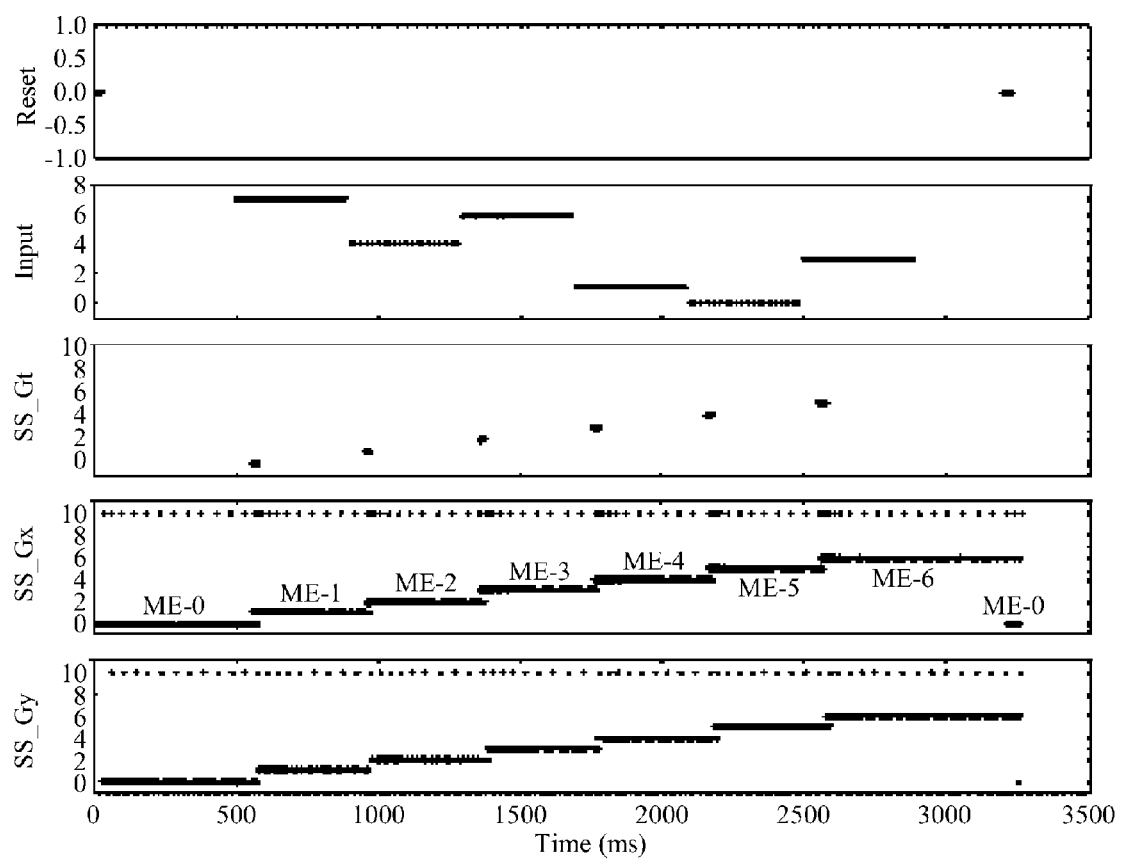
FIG. 22 is a diagram illustrating an example of input and output of a shift selector of the working memory device of FIG. 20.
Figure 23:
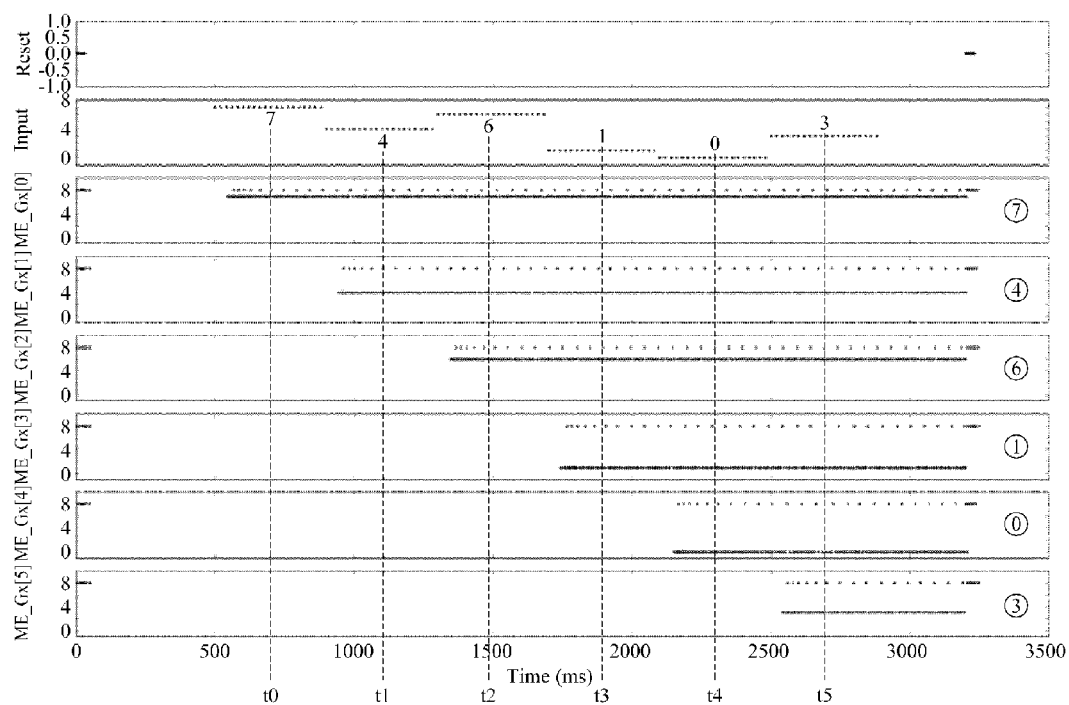
FIG. 23 is a diagram illustrating an example of output of MEs of the working memory device of FIG. 20.

An example of input and output being performed by each unit when values of 7, 4, 6, 1, 0, and 3 are sequentially input to the working memory device of FIG. 20 will be described with reference to FIGS. 21 through 24. FIG. 21 illustrates an example of input and output of the input interface 1310 and the 1320 multiplexer of the working memory device of FIG. 20. FIG. 22 illustrates an example of input and output of the shift selector 1330 of the working memory device of FIG. 20. FIG. 23 illustrates an example of output of the MEs 1340, 1350, and 1360 of the working memory device of FIG. 20.

Figure 24:
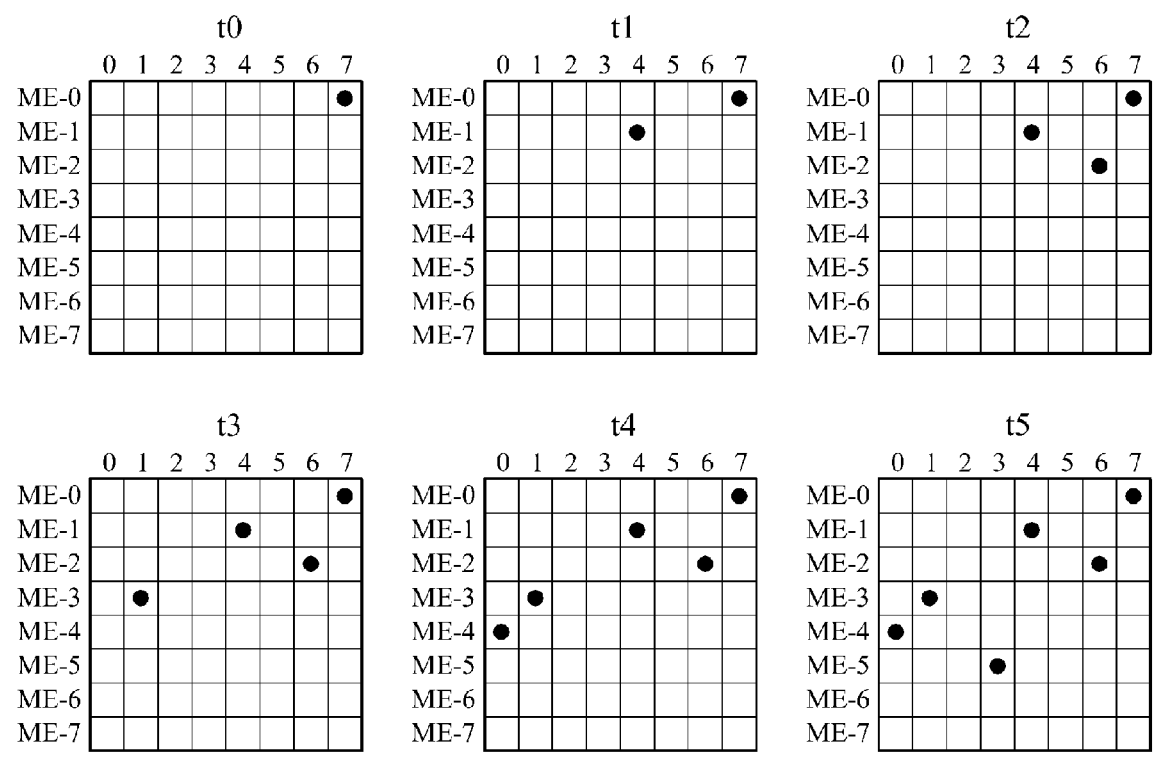

FIG. 24 illustrates an example of a pattern of activated neurons of MEs for each time marked on FIG. 20.

Referring to FIG. 21, an input spike signal is converted to a burst signal having a predetermined time slot, and the burst signal is output. In addition, the multiplexer 1320 may output a burst signal having a predetermined value. In FIG. 21, 'Reset' denotes a spike signal that initializes the MEs 1340, 1350, 1360, 'Input' denotes a spike signal input to the input interface 1310, 'Intf' denotes a burst signal output from the input interface 1310, and 'Multiplexer' denotes a multiplexed burst signal output from the multiplexer 1320.

Referring to FIG. 22, a value of 'SS_Gt' sequentially increases every time values of '7', '4', '6', '1', '0', and '3' are sequentially input to the input interface 1310, and values of 'SS_Gx' and 'SS_Gy' sequentially increase based on the sequential increase in the values of 'SS_Gt'. Accordingly, the MEs may be sequentially selected. In FIG. 22, 'Reset' denotes a spike signal to initialize the MEs 1340, 1350, and 1360, 'Input' denotes a spike signal input to the input interface 1310, 'SS_Gx' denotes an output from the selection neurons 1621, 1631, and 1651 and the inhibitory neuron 1661 included in Group X of the shift selector 1330, 'SS_Gy' denotes an output from the selection neurons 1622, 1632, and 1652 and the inhibitory neuron 1662 included in Group Y of the shift selector 1330, and 'SS_Gt' denotes an output of the shift selection neurons 1623, 1633, and 1653 included in Group t.

Referring to FIG. 23, features corresponding to spike signals may be stored in the $ME_0$ 1340 through the $ME_5$, sequentially, and an ME that stores an input may continuously output a spike signal corresponding to the stored input until a reset signal is input. In FIG. 23, 'Reset' denotes a spike signal to initialize the MEs 1340, 1350, and 1360, 'Input' denotes a spike signal input to the input interface 1310, 'ME0' through 'ME5' denote spike signals output from the $ME_0$ 1340 through the $ME_5$, respectively.

Referring to a state of an ME in each time, t0 through t5, as shown in FIGS. 23 and 24, a working memory that converts a spatio-temporal pattern of a spike signal that varies over time into a spatio pattern may be recognized.

Figure 25:
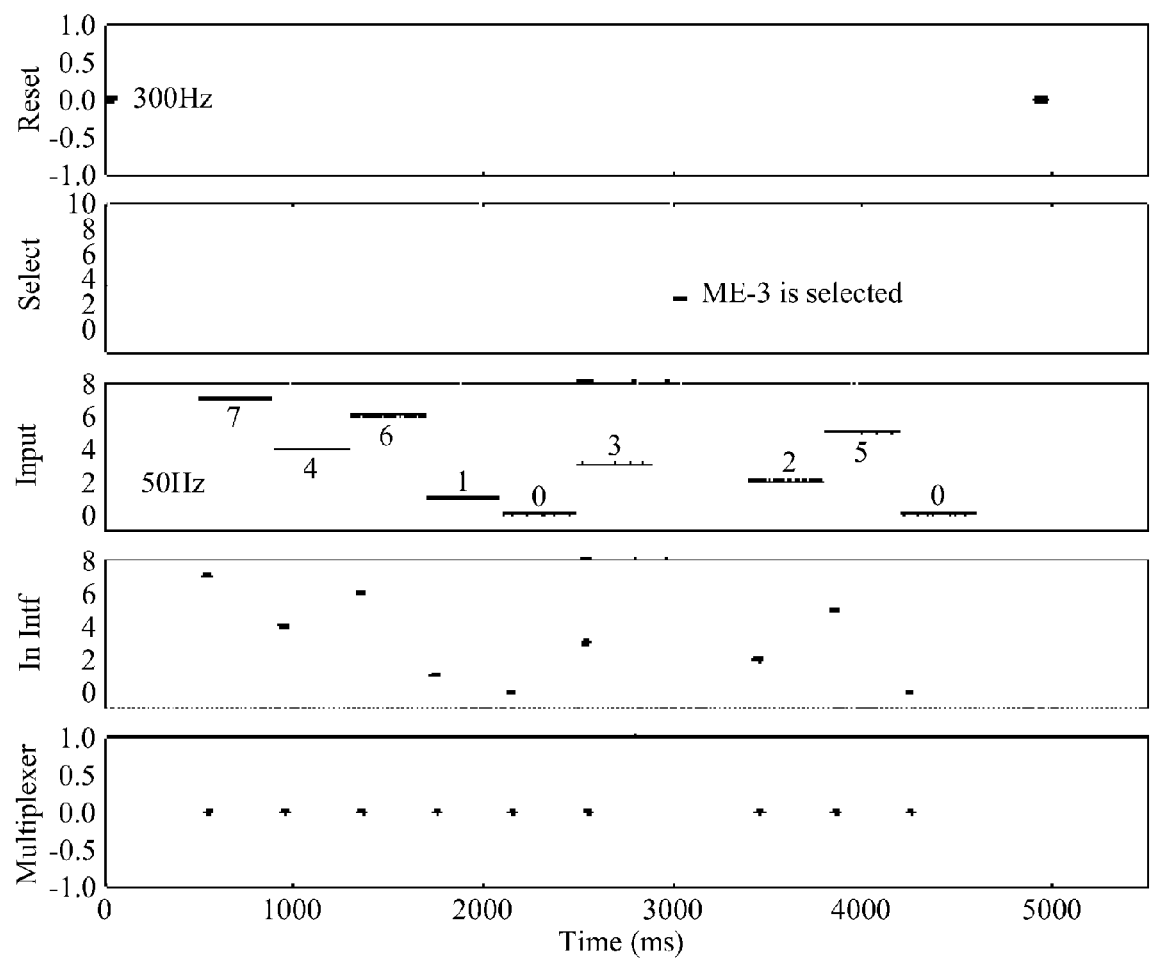
FIG. 25 is a diagram illustrating an example of input and output being performed by an input interface and a multiplexer of the working memory device of FIG. 20 when an ME is selected.
Figure 26:
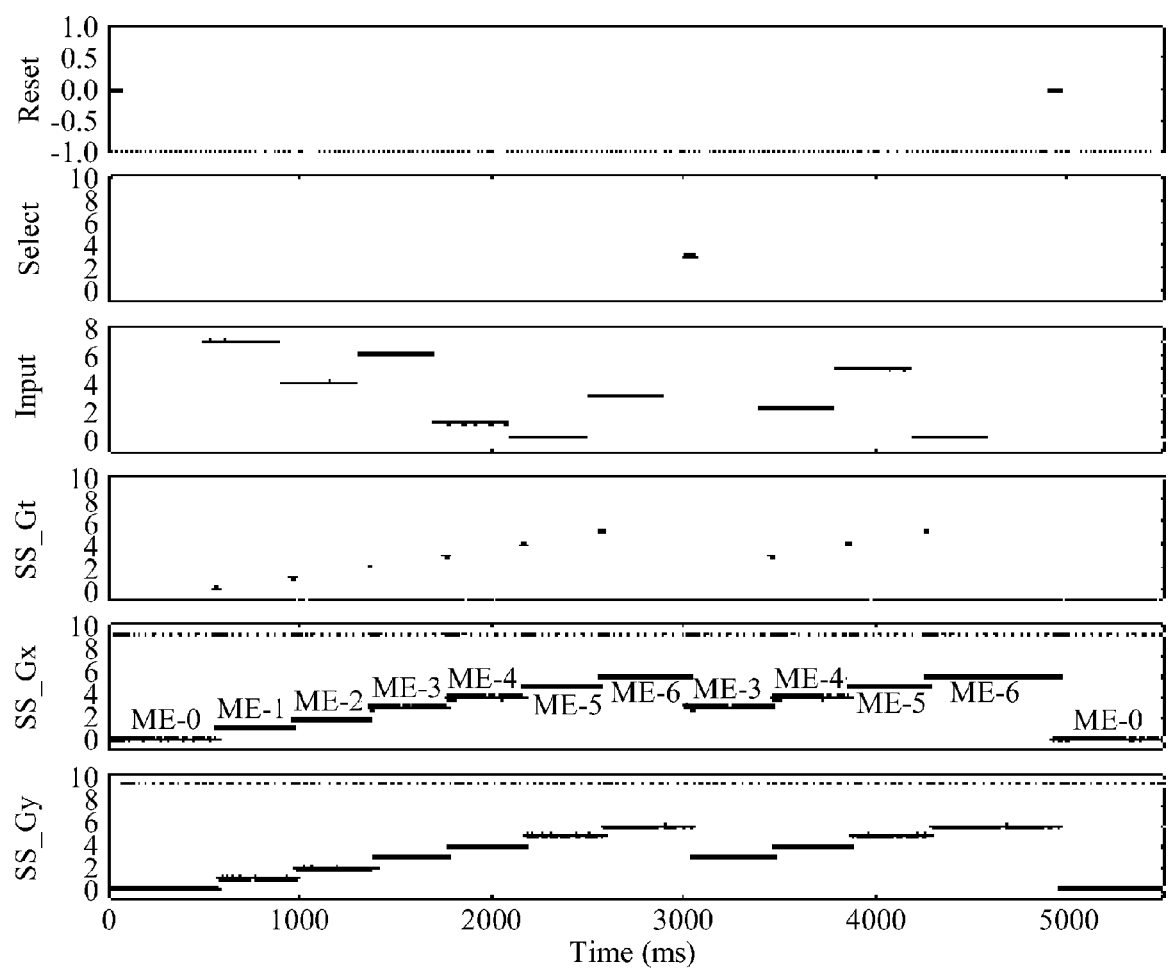
FIG. 26 is a diagram illustrating an example of input and output being performed by a shift selector of the working memory device of FIG. 20 when an ME is selected.
Figure 27:
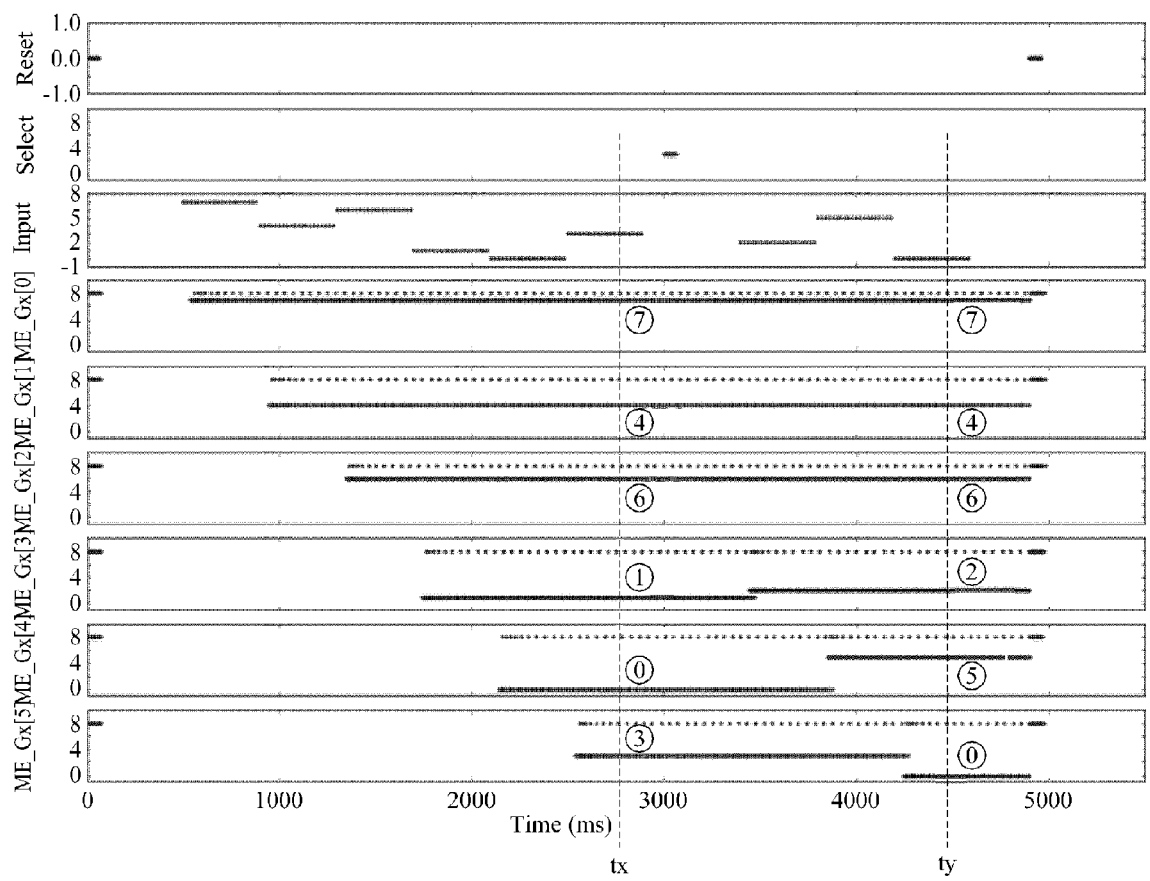
FIG. 27 is a diagram illustrating an example of output of MEs of the working memory device of FIG. 20 when an ME is selected.
Figure 28:
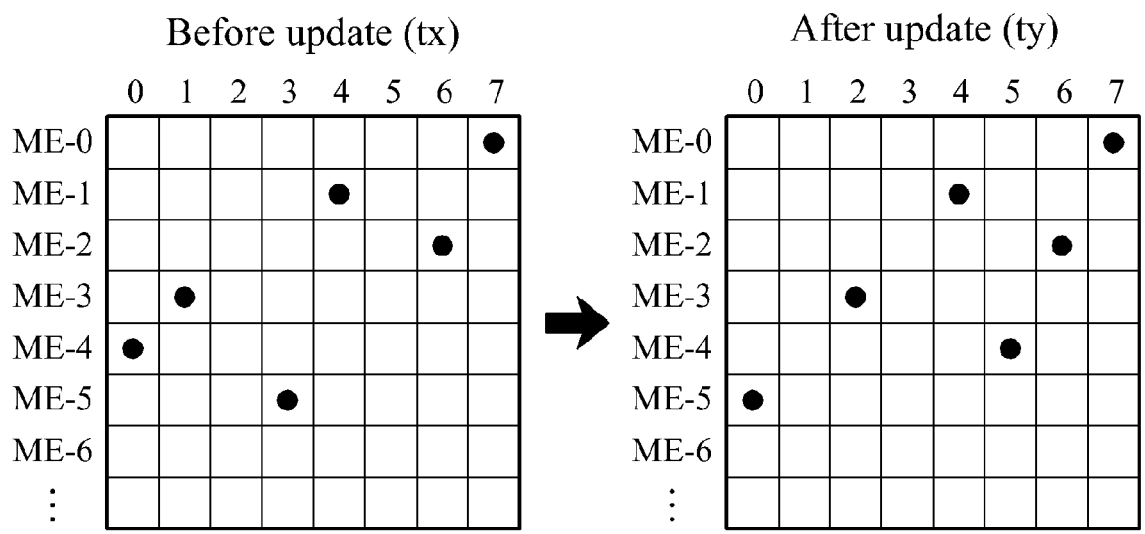
FIG. 28 is a diagram illustrating an example of a pattern of activated neurons of MEs for each time marked on FIG. 27.

An example of input and output of each unit, when values of '7', '4', '6', '1', '0', and '3' are sequentially input to the working memory device, a third ME ($ME_3$) is selected by a shift selector 1330, and inputs of '2', '5', and '0' are sequentially input, will be described with reference to FIGS. 25 through 28. FIG. 25 illustrates an example of input and output being performed by the input interface 1310 and the multiplexer 1320 of the working memory device of FIG. 20 when an ME is selected. FIG. 26 illustrates an example of input and output being performed by the shift selector 1330 of the working memory device of FIG. 20 when an ME is selected. FIG. 27 illustrates an example of output of MEs of the working memory device of FIG. 20 when an ME is selected. FIG. 28 illustrates an example of a pattern of activated neurons of MEs for each time marked on FIG. 27

Referring to FIG. 25, an input spike signal is converted to a burst signal having a predetermined time slot, and the burst signal is output. The multiplexer 1320 may output a burst signal having a predetermined value. In FIG. 25, 'Reset' denotes a spike signal to initialize the MEs 1340, 1350, and 1360, 'Input' denotes a spike signal input to the input interface 1310, 'In Intf' denotes a burst signal output from the input interface 1310, 'Multiplexer' denote a multiplexed burst signal output from the multiplexer 1320, and 'Select' denotes a selection signal input to the shift selector 1330.

Referring to FIG. 26, a value of 'SS_Gt' sequentially increases every time values of '7', '4', '6', '1', '0', and '3' are sequentially input to the input interface 1310, and values of 'SS_Gx' and 'SS_Gy' sequentially increase based on the sequential increase in the values of 'SS_Gt'. Accordingly, MEs may be sequentially selected. In addition, when a selection signal corresponding to the $ME_3$ is input as 'Select', a value of 'SS_Gt' may be changed to '3' and thus, the $ME_3$ corresponding to values of SS_Gx and SS_Gy may be selected. After the $ME_3$ is selected, values of SS_Gt, SS_Gx, and SS_Gy may sequentially increase every time values of '2', '5', and '0' are sequentially input.

In FIG. 26, 'Reset' denotes a spike signal to initialize the MEs 1340, 1350, and 1360, 'Input' denotes a spike signal input to the input interface 1310, 'SS_Gx' denotes an output from the selection neurons 1621, 1631, and 1651 and the inhibitory neuron 1661 included in Group X of the shift selector 1330, 'SS_Gy' denotes an output from the selection neurons 1622, 1632, and 1652 and the inhibitory neuron 1662 included in Group Y of the shift selector 1330, 'SS_Gt' denotes an output of the shift selection neurons 1623, 1633, and 1653 included in Group t, and 'Select' denotes a selection signal input to the shift selector 1330.

Referring to FIG. 27, features corresponding to spike signals may be sequentially stored in the $ME_0$ 1340 through the $ME_5$, and may be continuously output. When a selection signal corresponding to the $ME_3$ is input as 'Select' and then inputs of '2', '5', and '0' are sequentially input to MEs, values of '1', '0' and '3' previously stored in the $ME_3$, $ME_4$, and $ME_5$ may be changed to values '2', '5', and '0', respectively, and continuously output. In FIG. 27, 'Reset' denotes a spike signal to initialize the MEs 1340, 1350, and 1360, 'Input' denotes a spike signal input to the input interface 1310, 'ME0' through 'ME5' denote spike signals output from the $ME_0$ 1340 through the $ME_5$, and 'Select' denotes a selection signal input to the shift selector 1330.

FIG. 28 illustrates a state of each ME at tx and ty defined in FIG. 27. When a state of each ME at tx is compared to a state of each ME at ty, states of $ME_3$, $ME_4$ and $ME_5$ are updated.

According to teachings above, example embodiments may provide a spiking neuron-based working memory device that may temporarily store, during a desired time, an input pattern varying over time so that cognition of varied patterns may be enabled.

The units described herein may be implemented using hardware components and software components, i.e., microphones, amplifiers, band-pass filters, audio to digital converters, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller.

In addition, different processing configurations are possible, such a parallel processors. As used herein, a processing device configured to implement a function A includes a processor programmed to run specific software. In addition, a processing device configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums. The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. In addition, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A spiking neuron-based working memory device, comprising:
    an input interface configured to convert input spike signals into respective burst signals having predetermined forms, and output a sequence of the burst signals, the burst signals corresponding to the input spike signals in a burst structure; and
    two or more memory elements (MEs) each configured to receive a different one of the burst signals, store a feature corresponding to the received burst signal, and continuously output a spike signal corresponding to the stored feature but not identical to the received burst signal.

2. The device of claim 1, wherein, when one of the features respectively corresponding to one of the burst signals is stored in one of the MEs, the one of the MEs is deactivated and activates a subsequent one of the MEs.

3. The device of claim 1, wherein, when one of the features respectively corresponding to one of the burst signals is stored in one of the MEs, the one of the MEs continuously outputs the spike signal corresponding to the stored feature until the one of the MEs is initialized by a reset signal.

4. The device of claim 1, wherein, for each of the features that respectively corresponds to the burst signals, the input interface comprises an excitatory neuron and an inhibitory neuron, the excitatory neuron being configured to convert one of the input spike signals to be included in the burst structure, the burst structure having a predetermined time slot, the inhibitory neuron being configured to suppress the excitatory neuron to enable the burst-structured one of the input spike signals to have a predetermined size to generate a corresponding one of the burst signals.

5. The device of claim 4, wherein, for each of the features that respectively corresponds to the burst signals, the input interface further comprises a synapse and a noise removal neuron, the synapse having a short-term facilitation characteristic, the synapse being configured to transfer the one of the input spike signals to the noise removal neuron, the noise removal neuron being configured to remove noise from the transferred one of the input spike signals, the noise removal neuron being further configured to transfer the transferred one of the input spike signals from which noise is removed to the excitatory neuron.

6. A spiking neuron-based working memory device, comprising:
    an input interface configured to convert input spike signals into respective burst signals having predetermined forms, and output a sequence of the burst signals, the burst signals corresponding to the input spike signals in a burst structure; and
    two or more memory elements (MEs) configured to sequentially store features respectively corresponding to the outputted sequence of the burst signals, each of the MEs continuously outputting spike signals respectively corresponding to the stored features, wherein
    each of the MEs comprises gate neurons, a continuity unit, and a control neuron, the gate neurons being configured, when activated, to transfer the burst signals received from the input interface to the continuity unit, the continuity unit being configured, when the transferred burst signals are input, to activate one or more neurons corresponding to the features respectively corresponding to the transferred burst signals, the continuity unit being further configured to continuously output the spike signals respectively corresponding to the features until a reset signal is input, the control neuron being configured to activate or suppress the gate neurons.

7. The device of claim 6, wherein the control neuron is further configured to suppress the gate neurons when the control neuron receives an idle signal from a previous ME or the continuously outputted spike signals, and
    wherein the control neuron is further configured to activate the gate neurons when an input signal is absent.

8. The device of claim 7, wherein the control neuron is further configured to interrupt a suppression of the gate neurons when one of the burst signals is stored in the previous ME and an outputting of the idle signal from the previous ME is interrupted.

9. The device of claim 6, wherein an amount of the gate neurons is equal to an amount of features corresponding to input spike signals received by the input interface.

10. The device of claim 6, wherein the continuity unit comprises continuity neurons for each of the features, one or more idle neurons, and one or more inhibitory neurons, the continuity neurons being configured to continuously output the spike signals respectively corresponding to the features when the transferred burst signals are received, the idle neurons being configured to output an idle signal indicating an idle state in response to the reset signal, the inhibitory neurons being configured to suppress the continuity neurons and the idle neuron so that only one type of the spike signals is output per output.

11. The device of claim 10, wherein the control neuron is further configured to suppress the gate neurons in order to deactivate the gate neurons when one of the a spike signals is received from one of the continuity neurons.

12. A spiking neuron-based working memory device, comprising:
an input interface configured to convert an input spike signals into respective burst signals having predetermined forms, the burst signals corresponding to the input spike signals in a burst structure;
a multiplexer configured to convert the burst signals to multiplexed burst signals having predetermined values; and
a shift selector configured to output an activation signal to select one of two or more memory elements (MEs) of the spiking neuron-based working memory device when the multiplexed burst signals output from the multiplexer are input, the MEs being configured to sequentially store features respectively corresponding to the burst signals of the input interface when the activation signal output from the shift selector is received, each of the MEs continuously outputting spike signals respectively corresponding to the stored features.

13. The device of claim 12, wherein, when an external selection signal for selecting one of the MEs is received from an external side of the shift selector, the shift selector outputs the activation signal to the selected one of the MEs.

14. The device of claim 13, wherein the external selection signal is one of a plurality of external selection signals, and
wherein an amount of the external selection signals is equal to an amount of the MEs.

15. The device of claim 12, wherein, when one of the features respectively corresponding to one of the burst signals is stored in one of the MEs, the one of the MEs continuously outputs one of the spike signals respectively corresponding to the one of the features until the one of the MEs is initialized by a reset signal.

16. The device of claim 12, wherein, for each of the features that respectively corresponds to the burst signals, the input interface comprises an excitatory neuron and an inhibitory neuron, the excitatory neuron being configured to convert one of the input spike signals to be included in the burst structure, the burst structure having a predetermined time slot, the inhibitory neuron being configured to suppress the excitatory neuron to enable the burst-structured one of the input spike signals to have a predetermined size to generate a corresponding one of the burst signals.

17. The device of claim 16, wherein, for each of the features that respectively corresponds to the burst signals, the input interface further comprises a synapse and a noise removal neuron, the synapse having a short-term facilitation characteristic, the synapse being configured to transfer the one of the input spike signals to the noise removal neuron, the noise removal neuron being configured to remove noise from the transferred one of the input spike signals, the noise removal neuron being further configured to input by the synapse and to transfer the transferred one of the input spike signals from which noise is removed to the excitatory neuron.

18. The device of claim 12, wherein each of the MEs comprises gate neurons and a continuity unit, the gate neurons being configured, when activated by the shift selector, to transfer the burst signals received from the input interface to the continuity unit, the continuity unit being configured, when the transferred burst signals are input, to activate one or more neurons corresponding to the features respectively corresponding to the transferred burst signals, the continuity unit being further configured to continuously output the spike signals respectively corresponding to the features until a reset signal is input.

19. The device of claim 18, wherein an amount of the gate neurons is equal to an amount of features corresponding to input spike signals received by the input interface.

20. The device of claim 18, wherein the continuity unit comprises continuity neurons for each of the features and one or more inhibitory neurons, the continuity neurons being configured to continuously output the spike signals respectively corresponding to the features when the transferred burst signals are received, the inhibitory neurons being configured to suppress the continuity neurons so that only one type of the spike signals is output per output.

21. The device of claim 20, wherein, when the reset signal is received, the inhibitory neuron initializes the continuity unit to interrupt the spike signals being continuously output.

22. The device of claim 18, wherein the shift selector comprises selection neurons, shift selection neurons, one or more inhibitory neurons, and a control neuron, the selection neurons being configured, when activated, to continuously output the activation signal to activate the gate neurons included in the selected one of the MEs, the shift selection neurons being configured to activate a subsequent one of the selection neurons when one of the multiplexed burst signals is received from the multiplexer, the inhibitory neurons being configured to suppress the selection neurons so that the subsequent one of the selection neurons outputs an activation signal, the control neuron being configured to continuously output a signal that suppresses the shift selection neurons.

23. The device of claim 22, wherein the subsequent one of the selection neurons receives a reset signal, and
wherein the subsequent one of the selection neurons continuously transmits the activation signal to the gate neurons included in the selected one of the MEs.

24. The device of claim 22, wherein the control neuron continuously outputs a signal suppressing the gate neurons included in each of the MEs.

* * * * *